United States Patent
Guan et al.

(10) Patent No.: US 12,225,476 B2
(45) Date of Patent: Feb. 11, 2025

(54) POWER ADJUSTMENT METHOD AND APPARATUS

(71) Applicant: HUAWEI TECHNOLOGIES CO., LTD., Shenzhen (CN)

(72) Inventors: Peng Guan, Shenzhen (CN); Xi Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 399 days.

(21) Appl. No.: 17/707,293

(22) Filed: Mar. 29, 2022

(65) Prior Publication Data

US 2022/0225242 A1 Jul. 14, 2022

Related U.S. Application Data

(63) Continuation of application No. PCT/CN2019/109765, filed on Sep. 30, 2019.

(51) Int. Cl.
H04W 52/24 (2009.01)
H04W 52/14 (2009.01)

(52) U.S. Cl.
CPC ....... *H04W 52/242* (2013.01); *H04W 52/146* (2013.01)

(58) Field of Classification Search
CPC . H04W 52/242; H04W 52/146; H04W 52/54; H04L 5/0051; H04L 5/0055; H04L 5/0091; H04B 7/0617; H04B 7/086
USPC ........................................................ 455/522
See application file for complete search history.

(56) References Cited

U.S. PATENT DOCUMENTS

| | | | | |
|---|---|---|---|---|
| 11,191,029 B2* | 11/2021 | Li | ................. | H04W 52/146 |
| 2018/0368107 A1* | 12/2018 | Babaei | ................. | H04W 76/00 |

FOREIGN PATENT DOCUMENTS

| | | |
|---|---|---|
| CN | 102883343 A | 1/2013 |
| CN | 102938930 A | 2/2013 |
| CN | 103444237 A | 12/2013 |
| CN | 108924920 A | 11/2018 |
| CN | 109392065 A | 2/2019 |
| EP | 3282776 A1 | 2/2018 |
| WO | 2018018015 A1 | 1/2018 |

(Continued)

OTHER PUBLICATIONS

Chinese Office Action issued in corresponding Chinese Application No. 201980100850.X, dated Aug. 31, 2023, pp. 1-52.

(Continued)

*Primary Examiner* — Eugene Yun
(74) *Attorney, Agent, or Firm* — HAUPTMAN HAM, LLP

(57) ABSTRACT

A power adjustment method and an apparatus are provided, to improve stability of transmit power of an uplink signal, so that the uplink signal can be effectively transmitted. The method includes: receiving a MAC CE (201), where the MAC CE is used to update a pathloss estimation reference signal; and determining a pathloss estimation value based on the pathloss estimation reference signal (202), where an effective time of the pathloss estimation value is not later than n+X+T, n is a time for sending feedback information, the feedback information is used to feed back whether the MAC CE is correctly received, X is fixed duration, and T is variable duration. It can be learned that the effective time of the pathloss estimation value is not later than n+X+T.

20 Claims, 7 Drawing Sheets

(56) References Cited

FOREIGN PATENT DOCUMENTS

| WO | 2018097947 A2 | 5/2018 |
|----|---------------|--------|
| WO | 2018127022 A1 | 7/2018 |
| WO | 2018127181 A1 | 7/2018 |
| WO | 2018128409 A1 | 7/2018 |

OTHER PUBLICATIONS

3GPP, "Summary for AI 7.1.6.1 NR UL power control in non-CA aspects", R1-1805553, Jul. 26, 2018, total 27 pages.
3GPP TS 38.215 V15.5.0 (Jun. 2019), 3rd Generation Partnership Project; Technical Specification Group Radio Access Network; NR; Physical layer measurements(Release 15), 16 pages.
3GPP TS 38.211 V15.6.0 (Jun. 2019), 3rd Generation Partnership Project; Technical Specification Group Radio Access Network; NR;Physical channels and modulation(Release 15), total 97 pages.
3GPP TS 38.212 V15.6.0 (Jun. 2019), 3rd Generation Partnership Project; Technical Specification Group Radio Access Network;NR;Multiplexing and channel coding(Release 15), total 101 pages.
3GPP TS 38.213 V15.6.0 (Jun. 2019), 3rd Generation Partnership Project; Technical Specification Group Radio Access Network;NR;Physical layer procedures for control(Release 15), total 107 pages.
3GPP TS 38.214 V15.6.0 (Jun. 2019), 3rd Generation Partnership Project; Technical Specification Group Radio Access Network;NR;Physical layer procedures for data(Release 15), total 105 pages.
3GPP TS 38.321 V15.6.0 (Jun. 2019), 3rd Generation Partnership Project; Technical Specification Group Radio Access Network;NR;Medium Access Control (MAC) protocol specification(Release 15), total 78 pages.
3GPP TS 38.331 V15.6.0 (Jun. 2019), 3rd Generation Partnership Project; Technical Specification Group Radio Access Network; NR; Radio Resource Control (RRC) protocol specification(Release 15), 519 pages.
3GPP TS 38.133 V16.0.0 (Jun. 2019), 3rd Generation Partnership Project; Technical Specification Group Radio Access Network; NR; Requirements for support of radio resource management(Release 16), 1002 pages.
International Search Report issued in corresponding International Application No. PCT/CN2019/109765, dated Jun. 29, 2020, pp. 1-9.
Motorola, Discussion of remaining aspects in radio link monitoring. 3GPP TSG-RAN WG4 Meeting #49, Prague, CZ, Nov. 10-14, 2008, R4-083151, 5 pages.
European Office Action issued in corresponding European Application No. 19947616.9, dated Sep. 6, 2023, pp. 1-7.
India Office Action issued in corresponding India Application No. 202217023584, dated Sep. 9, 2022, pp. 1-7.
NTT Docomo, Remaining details on CSI-RS. 3GPP TSG RAN WG1 Meeting #92bis, Sanya, China, Apr. 16-20, 2018, R1-1805044, 3 pages.
ZTE, Maintenance for UL power control. 3GPP TSG RAN WG1 Meeting #94, Gothenburg, Sweden, Aug. 20-24, 2018, R1-1808200, 7 pages.
LG Electronics, Feature lead summary#4 of Enhancements on Multi-beam Operations. 3GPP TSG RAN WG1 Meeting #98, Prague, CZ, Aug. 26-30, 2019, R1-1909779, 38 pages.
3GPP TS 38.133 V15.7.0 (Sep. 2019), 3rd Generation Partnership Project; Technical Specification Group Radio Access Network; NR; Requirements for support of radio resource management(Release 15), 1043 pages.
Extended European Search Report issued in corresponding European Application No. 19947616.9, dated Aug. 25, 2022, pp. 1-14.

* cited by examiner

| | | | | | | | | |
|---|---|---|---|---|---|---|---|---|

| A/D | SRS resource set cell ID | | | SRS resource set BWPs ID | Oct 1 |
|---|---|---|---|---|---|
| R | R | C | SUL | SP SRS resource set ID | Oct 2 |
| $F_0$ | Resource $ID_0$ | | | | Oct 3 |

...

| $F_{M-1}$ | Resource $ID_{M-1}$ | | Oct N–M |
|---|---|---|---|
| R | Resource serving cell $ID_0$ | Resource BWP $ID_0$ | Oct N–M+1 |

...

| R | Resource serving cell $ID_{M-1}$ | Resource BWP $ID_{M-1}$ | Oct N |
|---|---|---|---|

FIG. 5

| | | | | | | | | |
|---|---|---|---|---|---|---|---|---|
| R | Serving cell ID | | | | | BWP ID | | Oct 1 |
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
...
| | | | | | | | |
|---|---|---|---|---|---|---|---|
| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8}$ | Oct N |
FIG. 6
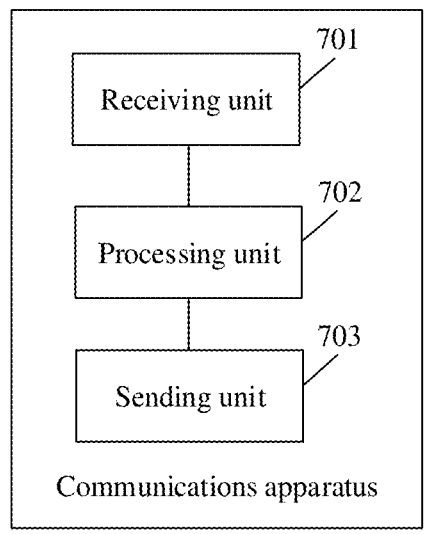
FIG. 7a
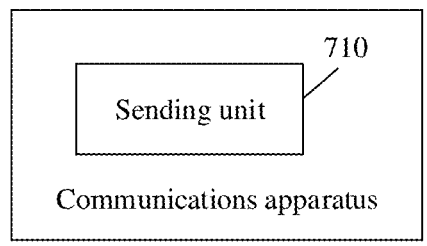
FIG. 7b

POWER ADJUSTMENT METHOD AND APPARATUS

CROSS-REFERENCE TO RELATED APPLICATIONS

This application is a continuation of International Application No. PCT/CN2019/109765, filed on Sep. 30, 2019, the disclosure of which is hereby incorporated by reference in its entirety.

TECHNICAL FIELD

This application relates to the field of communications technologies, and in particular, to a power adjustment method and an apparatus.

BACKGROUND

When a terminal device sends an uplink signal to a network device, the terminal device may first determine transmit power of the uplink signal. A method for determining the transmit power of the uplink signal is as follows: The terminal device performs higher-layer filtering on receive power of a pathloss estimation reference signal sent by the network device, to obtain reference signal received power obtained after the higher-layer filtering, then obtains a pathloss estimation value based on the reference signal received power obtained after the higher layer filtering and transmit power of the reference signal, and obtains the transmit power of the uplink signal based on the pathloss estimation value.

The network device may configure the pathloss estimation reference signal by using related signaling, and then the terminal device estimates the pathloss estimation value within a specific time by using the configured pathloss estimation reference signal.

However, in the foregoing method, the transmit power of the uplink signal that is obtained by the terminal device is usually unstable.

SUMMARY

Embodiments of this application provide a power adjustment method and an apparatus, to improve stability of transmit power of an uplink signal, so that the uplink signal can be effectively transmitted.

According to a first aspect, an embodiment of this application provides a power adjustment method. The method includes: receiving a medium access control control element (medium access control control element, MAC CE), where the MAC CE is used to update a pathloss estimation reference signal; determining a pathloss estimation value based on the pathloss estimation reference signal, where an effective time of the pathloss estimation value is not later than n+X+T, n is a time for sending feedback information, the feedback information is used to feed back whether the MAC CE is correctly received, X is fixed duration, and T is variable duration.

It can be learned that the effective time of the pathloss estimation value is not later than n+X+T. That is, a communications apparatus (for example, a terminal device or a chip) avoids a case in which filtering cannot be performed on receive power of the pathloss estimation reference signal for a plurality of times in a short time. Therefore, the communications apparatus can have sufficient time to perform filtering on the receive power of the pathloss estimation reference signal (which is also referred to as reference signal received power) for a plurality of times, to determine the pathloss estimation value. In addition, the receive power is obtained by performing filtering for a plurality of times. This improves stability and accuracy of determining the pathloss estimation value.

In a possible implementation, the method further includes: after the pathloss estimation value takes effect, determining transmit power of an uplink signal based on the pathloss estimation value.

Although the effective time of the pathloss estimation value is not later than n+X+T, a time at which the communications apparatus determines the transmit power of the uplink signal by using the pathloss estimation value may not be earlier than n+X+T (at n+X+T, or after n+X+T). That is, the communications apparatus may determine the transmit power of the uplink signal based on the pathloss estimation value at n+X+T, or the communications apparatus may determine the transmit power of the uplink signal based on the pathloss estimation value after n+X+T.

In embodiments of this application, stability and accuracy of the pathloss estimation value are improved, to improve stability and accuracy of a result of determining the transmit power of the uplink signal. It may be understood that the uplink signal may include one or more of a physical random access channel (physical random access channel, PRACH), a physical uplink control channel (physical uplink control channel, PUCCH), a physical uplink shared channel (physical uplink shared channel, PUSCH), a sounding reference signal (sounding reference signal, SRS), a PUCCH de-modulation reference signal (de-modulation reference signal, DMRS), a PUSCH-DMRS, or an uplink phase tracking reference signal (phase tracking reference signal, PTRS).

In a possible implementation, the method further includes: sending the uplink signal at the transmit power after the pathloss estimation value takes effect.

In embodiments of this application, the uplink signal is sent after the pathloss estimation value takes effect, so that the uplink signal can be transmitted stably and in time. This improves signal transmission stability.

In a possible implementation, T is related to network configuration information and/or capability information of a terminal device, and the capability information of the terminal device includes higher-layer filtering capability information of the terminal device. The capability information of the terminal device is used to indicate a capability of the terminal device. The terminal device needs to report the capability information of the terminal device to a network device. The network device may configure related capability information for the terminal device based on the capability information of the terminal device. It may be understood that the capability information configured by the network device may be the same as or different from the capability information reported by the terminal device. This is not limited in embodiments of this application.

In embodiments of this application, T may change with higher-layer filtering capability information of a terminal device. This avoids a case in which a terminal device may generate waiting duration because different terminal devices all use same duration, where the waiting duration may be understood as duration in which a terminal device has determined a pathloss estimation value but needs to wait for the pathloss estimation value to take effect because a specified time does not expire. Alternatively, this avoids a case in which an uplink signal cannot be stably sent because a terminal device has not effectively determined a pathloss estimation value, and needs to use the pathloss estimation value that is not effectively determined.

In a possible implementation, the network configuration information includes at least one of higher-layer filtering configuration information, a quantity of measurements, a measurement periodicity, a measurement setting, or time domain information of the pathloss estimation reference signal. That is, the information is information configured by the network device, or the information is information predefined in a protocol.

In a possible implementation, the higher-layer filtering capability information includes at least one of higher-layer filtering configuration information, a quantity of measurements, a measurement periodicity, a measurement setting, or time domain information of the pathloss estimation reference signal. The quantity of measurements is a quantity of measurements of receive power of the pathloss estimation reference signal, the measurement periodicity is a transmission periodicity of the pathloss estimation reference signal, and the measurement setting is a setting related to the pathloss estimation reference signal.

In a possible implementation, T=Quantity of measurements*Measurement periodicity.

In a possible implementation, the MAC CE includes information about the pathloss estimation reference signal.

In embodiments of this application, the MAC CE includes the information about the pathloss estimation reference signal, so that the communications apparatus can estimate the pathloss estimation value based on the pathloss estimation reference signal in the MAC CE. Compared with configuring the pathloss estimation reference signal by using radio resource control (radio resource control, RRC) signaling, signaling overheads are reduced and a delay is shortened.

In a possible implementation, the MAC CE further includes a parameter related to the transmit power of the uplink signal, and the parameter related to the transmit power of the uplink signal includes at least one of target power, a pathloss compensation factor, or a power adjustment parameter.

In embodiments of this application, the target power, the pathloss compensation factor, and the power adjustment parameter are parameters related to the transmit power.

In a possible implementation, an effective time of the parameter related to the transmit power of the uplink signal is not later than n+X, or an effective time of the parameter related to the transmit power of the uplink signal is not later than n+X+T.

In embodiments of this application, after receiving the MAC CE, the communications apparatus may interpret the MAC CE to determine the transmit power of the uplink signal by using the parameter related to the transmit power and included in the MAC CE, or may determine the pathloss estimation value to determine the transmit power of the uplink signal by using the pathloss estimation value. When the effective time of the parameter related to the transmit power is not later than n+X+T, the parameter related to the transmit power of the uplink signal may be updated (that is, take effect) synchronously with the pathloss estimation value, so that accuracy of the transmit power of the uplink signal can be improved. When the parameter related to the transmit power is not later than n+X, a delay of adjusting the transmit power can be shortened.

In a possible implementation, the MAC CE includes information about a reference signal of an uplink transmit beam, and the pathloss estimation reference signal is related to the reference signal of the uplink transmit beam.

In embodiments of this application, the MAC CE may include the information about the reference signal of the uplink transmit beam. The information about the reference signal of the uplink transmit beam is included, so that the communications apparatus can update the pathloss estimation reference signal based on the reference signal of the uplink transmit beam. That is, the communications apparatus can update both the uplink transmit beam and the pathloss estimation reference signal by using the MAC CE, to reduce signal overheads, and avoid a case in which a plurality of MAC CEs are used to indicate the communications apparatus to separately adjust the pathloss estimation reference signal and the uplink transmit beam.

In a possible implementation, the method further includes: adjusting the uplink transmit beam based on the MAC CE, where an effective time of the uplink transmit beam is not later than n+X, or an effective time of the uplink transmit beam is not later than n+X+T.

In embodiments of this application, the uplink transmit beam may be updated without performing higher-layer filtering, but the pathloss estimation value may be determined by performing higher-layer filtering. Therefore, the effective time of the uplink transmit beam may be the same as or different from the effective time of the pathloss estimation value. When the effective time of the uplink transmit beam is not later than n+X+T, the uplink transmit beam may be updated (that is, take effect) synchronously with the pathloss estimation value. This improves accuracy of the transmit power of the uplink signal. When the effective time of the uplink transmit beam is not later than n+X, a delay can be shortened.

In a possible implementation, the MAC CE includes information about a reference signal of a downlink transmit beam, and the pathloss estimation reference signal is related to the reference signal of the downlink transmit beam.

In embodiments of this application, the downlink transmit beam is a downlink transmit beam used by the network device to send a downlink signal. As the downlink transmit beam changes, that is, the downlink transmit beam used by the network device to send the downlink signal changes, a downlink receive beam corresponding to the downlink transmit beam changes, an uplink transmit beam changes, and the transmit power of the uplink signal changes. That is, the downlink receive beam, the uplink transmit beam, and the pathloss estimation reference signal all can be updated by using the MAC CE, to reduce signal overheads, and avoid a case in which a plurality of MAC CEs are used to indicate the communications apparatus to separately adjust the downlink receive beam, the uplink transmit beam, and the pathloss estimation reference signal.

In a possible implementation, the method further includes: adjusting an uplink transmit beam and a downlink receive beam based on the downlink transmit beam, where an effective time of the downlink receive beam and that of the uplink transmit beam are not later than n+X+T; or an effective time of the downlink receive beam is not later than n+X, and an effective time of the uplink transmit beam is not later than n+X+T; or an effective time of the downlink receive beam and that of the uplink transmit beam are not later than n+X.

According to a second aspect, an embodiment of this application provides a communications apparatus. The communications apparatus includes a processing unit and a receiving unit. The receiving unit is configured to receive a medium access control control element MAC CE, where the MAC CE is used to update a pathloss estimation reference signal. The processing unit is configured to determine a pathloss estimation value based on the pathloss estimation reference signal, where an effective time of the pathloss estimation value is not later than n+X+T, n is a time for sending feedback information, the feedback information is used to feed back whether the MAC CE is correctly received, X is fixed duration, and T is variable duration. The processing unit is further configured to determine transmit power of an uplink signal based on the pathloss estimation value.

In a possible implementation, the apparatus further includes a sending unit, configured to send the uplink signal at the transmit power after the pathloss estimation value takes effect.

In a possible implementation, T is related to network configuration information and/or capability information of a terminal device.

In a possible implementation, the higher-layer filtering capability information includes at least one of higher-layer filtering configuration information, a quantity of measurements, a measurement periodicity, a measurement setting, or time domain information of the pathloss estimation reference signal. The quantity of measurements is a quantity of measurements of receive power of the pathloss estimation reference signal, the measurement periodicity is a transmission periodicity of the pathloss estimation reference signal, and the measurement setting is a setting related to the pathloss estimation reference signal.

In a possible implementation, the network configuration information includes at least one of higher-layer filtering configuration information, a quantity of measurements, a measurement periodicity, a measurement setting, or time domain information of the pathloss estimation reference signal. That is, the information is information configured by a network device, or the information is information predefined in a protocol.

In a possible implementation, the MAC CE includes information about the pathloss estimation reference signal.

In a possible implementation, the MAC CE further includes a parameter related to the transmit power of the uplink signal, and the parameter related to the transmit power of the uplink signal includes at least one of target power, a pathloss compensation factor, or a power adjustment parameter.

In a possible implementation, an effective time of the parameter related to the transmit power of the uplink signal is not later than n+X, or an effective time of the parameter related to the transmit power of the uplink signal is not later than n+X+T.

In a possible implementation, the MAC CE includes information about a reference signal of an uplink transmit beam, and the pathloss estimation reference signal is related to the reference signal of the uplink transmit beam.

In a possible implementation, the processing unit is further configured to adjust the uplink transmit beam based on the MAC CE, where an effective time of the uplink transmit beam is not later than n+X, or an effective time of the uplink transmit beam is not later than n+X+T.

In a possible implementation, the MAC CE includes information about a reference signal of a downlink transmit beam, and the pathloss estimation reference signal is related to the reference signal of the downlink transmit beam.

In a possible implementation, the processing unit is further configured to adjust an uplink transmit beam and a downlink receive beam based on the downlink transmit beam, where an effective time of the downlink receive beam and that of the uplink transmit beam are not later than n+X+T; or an effective time of the downlink receive beam is not later than n+X, and an effective time of the uplink transmit beam is not later than n+X+T; or an effective time of the downlink receive beam and that of the uplink transmit beam are not later than n+X.

According to a third aspect, an embodiment of this application provides a power adjustment method. The method includes: sending a medium access control control element MAC CE to a terminal device, where the MAC CE is used to update a pathloss estimation reference signal.

In a possible implementation, the MAC CE includes information about the pathloss estimation reference signal.

In a possible implementation, the MAC CE further includes a parameter related to the transmit power of the uplink signal, and the parameter related to the transmit power of the uplink signal includes at least one of target power, a pathloss compensation factor, or a power adjustment parameter.

In a possible implementation, the MAC CE includes information about a reference signal of an uplink transmit beam, and the pathloss estimation reference signal is related to the reference signal of the uplink transmit beam.

In a possible implementation, the MAC CE includes information about a reference signal of a downlink transmit beam, and the pathloss estimation reference signal is related to the reference signal of the downlink transmit beam.

According to a fourth aspect, an embodiment of this application provides a communications apparatus, including a sending unit, configured to send a medium access control control element MAC CE to a terminal device, where the MAC CE is used to update a pathloss estimation reference signal.

In a possible implementation, the MAC CE includes information about the pathloss estimation reference signal.

In a possible implementation, the MAC CE further includes a parameter related to the transmit power of the uplink signal, and the parameter related to the transmit power of the uplink signal includes at least one of target power, a pathloss compensation factor, or a power adjustment parameter.

In a possible implementation, the MAC CE includes information about a reference signal of an uplink transmit beam, and the pathloss estimation reference signal is related to the reference signal of the uplink transmit beam.

In a possible implementation, the MAC CE includes information about a reference signal of a downlink transmit beam, and the pathloss estimation reference signal is related to the reference signal of the downlink transmit beam.

According to a fifth aspect, an embodiment of this application provides a communications apparatus. The communications apparatus includes a processor and a memory. The memory is configured to store computer-executable instructions, and the processor is configured to execute the computer-executable instructions stored in the memory, so that the communications apparatus performs the corresponding method in the first aspect.

According to a sixth aspect, an embodiment of this application provides a communications apparatus. The communications apparatus includes a processor and a memory. The memory is configured to store computer-executable instructions, and the processor is configured to execute the computer-executable instructions stored in the memory, so that the communications apparatus performs the corresponding method in the third aspect.

According to a seventh aspect, an embodiment of this application provides a communications apparatus. The communications apparatus includes a processor and an interface circuit. The interface circuit is configured to receive code instructions and transmit the code instructions to the processor, and the processor runs the code instructions, to perform the corresponding method in the first aspect.

According to an eighth aspect, an embodiment of this application provides a communications apparatus. The communications apparatus includes a processor and an interface circuit. The interface circuit is configured to receive code instructions and transmit the code instructions to the processor, and the processor runs the code instructions, to perform the corresponding method in the third aspect.

According to a ninth aspect, an embodiment of this application provides a communications apparatus. The communications apparatus includes a processor, a memory, and a transceiver. The transceiver is configured to receive a signal or send a signal, the memory is configured to store program code, and the processor is configured to invoke the program code in the memory, to perform the method in the first aspect.

According to a tenth aspect, an embodiment of this application provides a communications apparatus. The communications apparatus includes a processor, a memory, and a transceiver. The transceiver is configured to receive a signal or send a signal, the memory is configured to store program code, and the processor is configured to invoke the program code in the memory, to perform the method in the third aspect.

According to an eleventh aspect, an embodiment of this application provides a communications apparatus. The communications apparatus includes a processor. When the processor invokes a computer program in a memory, the method in the first aspect is performed.

According to a twelfth aspect, an embodiment of this application provides a communications apparatus. The communications apparatus includes a processor. When the processor invokes a computer program in a memory, the method in the third aspect is performed.

According to a thirteenth aspect, an embodiment of this application provides a communications system. The communications system includes a terminal device and a network device. The terminal device is configured to perform the method in the first aspect, and the network device is configured to perform the method in the third aspect.

According to a fourteenth aspect, an embodiment of this application provides a computer-readable storage medium. The computer-readable storage medium is configured to store instructions, and when the instructions are executed, the method in the first aspect is implemented.

According to a fifteenth aspect, an embodiment of this application provides a computer-readable storage medium. The computer-readable storage medium is configured to store instructions, and when the instructions are executed, the method in the third aspect is implemented.

According to a sixteenth aspect, an embodiment of this application provides a computer program product including instructions. When the instructions are executed, the method in the first aspect is implemented.

According to a seventeenth aspect, an embodiment of this application provides a computer program product including instructions. When the instructions are executed, the method in the third aspect is implemented.

BRIEF DESCRIPTION OF DRAWINGS

FIG. 5 is a schematic diagram of a signaling format according to an embodiment of this application;

FIG. 6 is a schematic diagram of a signaling format according to an embodiment of this application;

FIG. 7a is a schematic diagram of a structure of a communications apparatus according to an embodiment of this application;

FIG. 7b is a schematic diagram of a structure of a communications apparatus according to an embodiment of this application;

DESCRIPTION OF EMBODIMENTS

The following describes embodiments of this application with reference to the accompanying drawings in embodiments of this application.

In the specification, claims, and accompanying drawings of this application, the terms "first", "second", and the like are intended to distinguish between different objects but do not indicate a particular order. In addition, the terms "including", "having", and any other variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In this application, "at least one (item)" means one or more, "a plurality of" means two or more, and "at least two (items)" means two, three, or more. The term "and/or" is used to describe an association relationship for describing associated objects and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may indicate a, b, c, "a and b", "a and c", "b and c", or "a, b, and c", where a, b, and c may be singular or plural.

Figure 1:
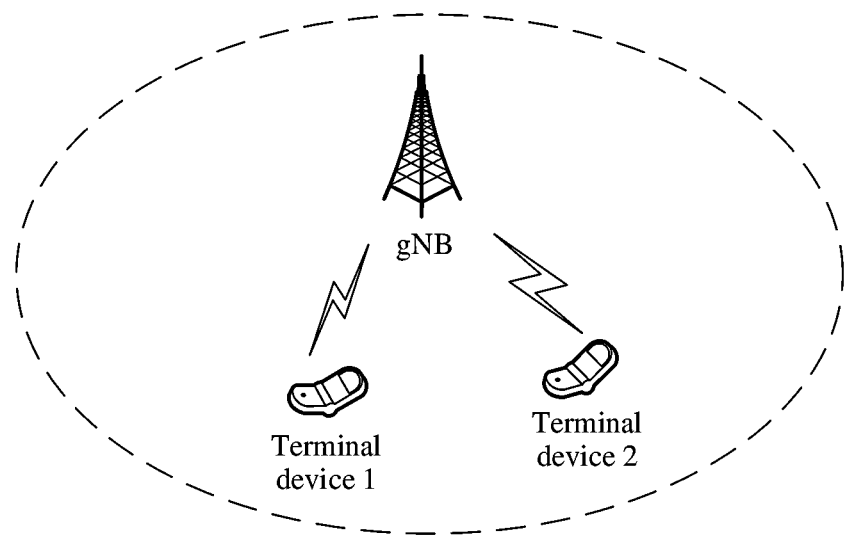
FIG. 1 is a schematic diagram of an architecture of a communications system according to an embodiment of this application.

First, a network architecture in embodiments of this application is described. A communications system used in this application may be understood as a wireless cellular communications system, or may be understood as a wireless communications system based on a cellular network architecture, or the like. A power adjustment method provided in this application may be applied to various communications systems, for example, an internet of things (internet of things, IoT) system, a narrowband internet of things (narrowband internet of things, NB-IoT) system, a long term evolution (long term evolution, LTE) system, a 5th generation (5th-generation, 5G) communications system, a hybrid architecture of LTE and 5G, a 5G new radio (new radio, NR) system, and a new communications system emerging in future communication development. The power adjustment method provided in embodiments of this application may be used, provided that a pathloss estimation value needs to be determined in a communications system. FIG. 1 is a schematic diagram of a communications system according to an embodiment of this application. The solutions in this application are applicable to the communications system. The communications system may include at least one network device, and only one network device is shown, for example, a next generation NodeB (the next generation NodeB, gNB) in the figure. The communications system may further include one or more terminal devices connected to the network device, for example, a terminal device 1 and a terminal device 2 in the figure.

The network device may be a device that can communicate with the terminal device. The network device may be any device that has a wireless transceiver function, and includes but is not limited to a base station. For example, the base station may be an eNB or an eNodeB (evolved NodeB) in long term evolution (long term evolution, LTE), or may be a gNB, or may be a base station in a future communications system. Optionally, the network device may alternatively be an access node, a wireless relay node, a wireless backhaul node, or the like in a wireless local area network (wireless fidelity, Wi-Fi) system. Optionally, the network device may alternatively be a radio controller in a cloud radio access network (cloud radio access network, CRAN) scenario. Optionally, the network device may alternatively be a wearable device, a vehicle-mounted device, or the like. Optionally, the network device may alternatively be a small cell, a transmission reception point (transmission reception point, TRP), or the like. It may be understood that the base station may alternatively be a base station in a future evolved public land mobile network (public land mobile network, PLMN) or the like.

The terminal device may also be referred to as user equipment (user equipment, UE), a terminal, or the like. The terminal device is a device having a wireless transceiver function. The terminal device may be deployed on land, and includes an indoor device, an outdoor device, a handheld device, a wearable device, or a vehicle-mounted device; or may be deployed on a water surface, for example, on a ship; or may be deployed in the air, for example, on an airplane, a balloon, or a satellite. The terminal device may be a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical (remote medical), a wireless terminal in smart grid (smart grid), a wireless terminal in transportation safety (transportation safety), a wireless terminal in smart city (smart city), a wireless terminal in smart home (smart home), or the like. It may be understood that the terminal device may alternatively be a terminal device in a future 5G network, a terminal device in a future evolved PLMN, or the like.

Optionally, in the communications system shown in FIG. 1, the terminal device 1 and the terminal device 2 may also communicate with each other by using a device-to-device (device-to-device, D2D) technology, a vehicle-to-everything (vehicle-to-everything, V2X) technology, a machine-to-machine (machine-to-machine, M2M) technology, or the like.

A method for communication between the terminal device 1 and the terminal device 2 is not limited in embodiments of this application. It may be understood that, in the communications system shown in FIG. 1, the network device and the terminal device 1 may be configured to perform the power adjustment method provided in embodiments of this application, for example, may perform the method shown in FIG. 2. In addition, the network device and the terminal device 2 may also be configured to perform the power adjustment method provided in embodiments of this application.

In addition, the following describes a transmit power calculation formula and the power adjustment method in embodiments of this application.

Generally, uplink communication in a cellular network system means that a terminal device sends a signal to a network device such as a base station. The signal may include one or more of an uplink signal or an uplink physical channel. For example, the signal may include one or more of a physical random access channel (physical random access channel, PRACH), a physical uplink control channel (physical uplink control channel, PUCCH), a physical uplink shared channel (physical uplink shared channel, PUSCH), a sounding reference signal (sounding reference signal, SRS), a PUCCH de-modulation reference signal (de-modulation reference signal, DMRS), a PUSCH-DMRS, or an uplink phase tracking reference signal (phase tracking reference signal, PTRS). It may be understood that the signal is not limited thereto. The signal may alternatively be an uplink signal, an uplink physical channel, or the like of another type. This is not limited in embodiments of this application.

The PUSCH is used as an example, and transmit power of the PUSCH may meet the following formula:

$$P_{PUSCH,b1,f1,c1}(i1, j1, q_{d1}, l1) = \min \begin{Bmatrix} P_{CMAX,f1,c1}(i1), \\ P_{O\_PUSCH,b1,f1,c1}(j1) + 10 * \log_{10}(2^{\mu 1} * M1_{RB,b1,f1,c1}^{PUSCH}(i1)) + \\ \partial_{b1,f1,c1}(j1) * PL_{b1,f1,c1}(q_{d1}) + \Delta_{TF,b1,f1,c1}(i1) + f_{b1,f1,c1}(i1, l1) \end{Bmatrix} \quad (1)$$

Herein, $PL_{b1,f1,c1}(q_{d1})$ is a pathloss estimation value, and $q_{d1}$ is an identifier of a reference signal used by the terminal device. That is, the pathloss estimation value is a value estimated by the terminal device by using the reference signal whose identifier is $q_{d1}$. Specifically, the pathloss estimation value is obtained based on transmit power of the reference signal and receive power of the reference signal, the transmit power of the reference signal is notified by the network device to the terminal device, and the receive power of the reference signal is measured by the terminal device. It may be understood that the receive power of the reference signal is reference signal received power (reference signal received power, RSRP) (usually referred to as RSRP) obtained after higher-layer filtering. In other words, the RSRP needs to be obtained by the terminal device through filtering based on a plurality of measurement results.

Herein, $P_{PUSCH,b1,f1,c1}(i1,j1,q_{d1},l1)$ is first transmit power, and the first transmit power is the determined transmit power of the signal. Further, i1 is a transmission occasion (transmission occasion) of the PUSCH, j1 is an index of an element in a parameter set $P_{O\_PUSCH,b1,f1,c1}(j1)$, $q_{d1}$ is the identifier of the reference signal, l1 is a power control adjustment state with index (power control adjustment state with index) of the PUSCH, b1 is a bandwidth part (bandwidth part, BWP) of the PUSCH used by the terminal device, f1 is a carrier used by the terminal device, and c1 is a serving cell of the terminal device. $P_{CMAX,f1,c1}(i1)$ is maximum transmit power of the terminal device on the carrier f1 of the serving cell c1. $P_{O\text{-}PUSCH,b1,f1,c1}(j1)$ is target power of the terminal device, that is, may be specifically understood PUSCH as target power of the PUSCH at the network device, that is, power that the PUSCH expects to have when the PUSCH arrives at the network device, where the power may be configured by the network device. $M1_{RB,b1,f1,c1}^{PUSCH}(i1)$ is a total bandwidth of the PUSCH, $\partial_{b1,f1,c1}(j1)$ is a pathloss compensation factor, $\partial_{b1,f1,c1}(j1)*PL_{b1,f1,c1}(q_{d1})$ is a pathloss compensation value, $\Delta_{TF,b1,f1,c1}(i1)$ is a transmit power adjustment component of the PUSCH, and $f_{b1,f1,c1}(i1,l1)$ represents a power control adjustment state (power control adjustment state) of the PUSCH. The network device may directly indicate, by using downlink control information (downlink control information, DCI), whether the current transmit power of the PUSCH needs to be increased or decreased. It may be understood that specific descriptions of the formula (1) are not limited in embodiments of this application, and the parameters in the formula (1) may have other explanations. Details are not described herein.

Generally, radio resource control (radio resource control, RRC) signaling may be used to indicate the terminal device to perform a related operation. For example, the RRC signaling may be used to indicate the terminal device to update a pathloss estimation reference signal. However, configuring a related parameter of uplink transmit power control by using the RRC signaling has a long delay and low flexibility. Therefore, faster signaling such as MAC CE signaling is required to update the related parameter. For example, the MAC CE signaling may be used to indicate the terminal device to update the pathloss estimation reference signal. The MAC CE signaling may be carried on a physical downlink shared channel (physical downlink shared channel, PDSCH). An effective time of the MAC CE signaling is within 3 ms after the terminal device may send feedback information. To be specific, within 3 ms after the terminal device feeds back the feedback information corresponding to the MAC CE to the network device, the terminal device needs to complete the following operations: The terminal device interprets the MAC CE to obtain a new pathloss estimation reference signal, measures receive power of the pathloss estimation reference signal (that is, RSRP, receive power obtained after higher-layer filtering) (which may also be directly referred to as reference signal received power) based on the pathloss estimation reference signal, to obtain a pathloss estimation value, and determines transmit power of an uplink signal.

However, within 3 ms, a quantity of RSRP measurements by the terminal device is not large. In other words, samples required by the terminal device for filtering may not be sufficient, that is, an amount of RSRP obtained by the terminal device for higher-layer filtering is not sufficient. Consequently, the transmit power of the uplink signal is unstable. Therefore, embodiments of this application provide a power adjustment method, to improve stability of transmit power of an uplink signal, so that the uplink signal can be effectively transmitted.

Then, an example in which a communications apparatus is a terminal device is used to describe the power adjustment method provided in embodiments of this application.

Figure 2:
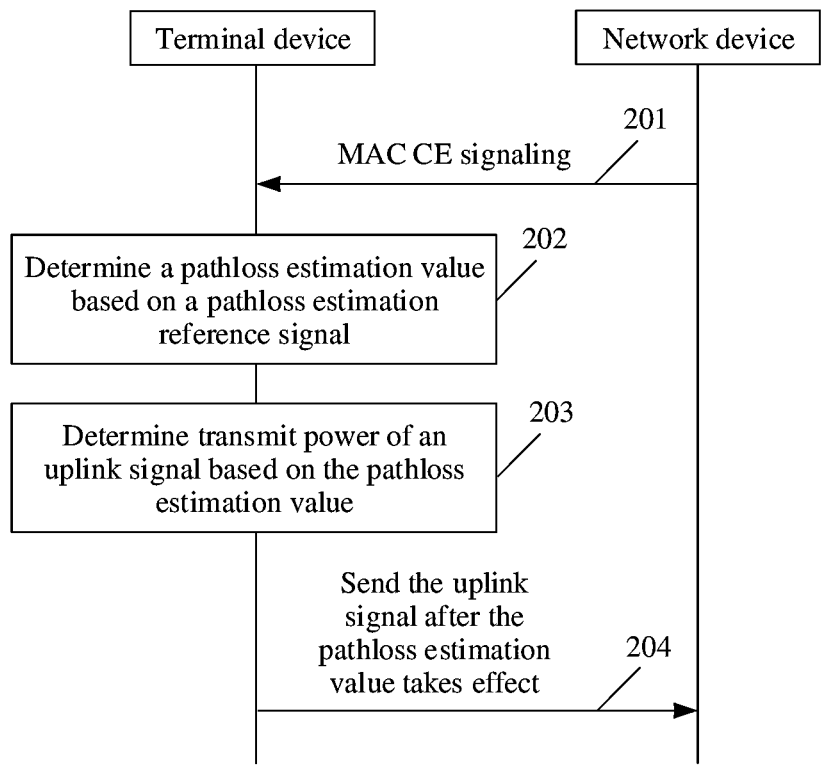
FIG. 2 is a schematic flowchart of a power adjustment method according to an embodiment of this application.

FIG. 2 is a schematic flowchart of a power adjustment method according to an embodiment of this application. As shown in FIG. 2, the power adjustment method includes the following steps.

201: A network device sends MAC CE signaling to a terminal device, where the MAC CE signaling is used to update a pathloss estimation reference signal.

For specific descriptions of the MAC CE signaling, refer to the following descriptions. Details are not described herein.

The pathloss estimation reference signal may also be referred to as a pathloss reference (pathloss reference) signal, that is, the terminal device may obtain a pathloss estimation value based on the pathloss estimation reference signal. Therefore, a specific name of the pathloss estimation reference signal is not limited in embodiments of this application.

Optionally, the network device may send the MAC CE signaling to the terminal device in any one or more of the following scenarios:

Scenario 1: The network device detects that a relative location of the terminal device to the network device changes. The relative location of the terminal device to the network device may be understood as that the location of the terminal device changes when the network device is used as a reference object.

Scenario 2: The network device determines that transmit power of an uplink signal of the terminal device is excessively low or high. When the transmit power of the uplink signal is excessively high, the terminal device may interfere with another terminal device. When the transmit power of the uplink signal is excessively low, the network device may fail to receive the uplink signal, or the network device may fail to correctly receive the uplink signal, or the like. In this case, the terminal device can avoid the foregoing case by re-determining the transmit power of the uplink signal.

Scenario 3: The network device needs to switch an uplink receive beam serving the terminal device. Because sending of the uplink receive beam changes, an uplink transmit beam needs to change. Therefore, the terminal device can match the uplink receive beam in time by re-adjusting transmit power of an uplink signal.

202: The terminal device receives the MAC CE signaling sent by the network device, and determines a pathloss estimation value based on the pathloss estimation reference signal (for example, $q_{d1}$ in the formula (1)).

In embodiments of this application, the pathloss estimation value may be $PL_{b1,f1,c1}(q_{d1})$ in the formula (1), and the pathloss estimation value is obtained by using transmit power of the pathloss estimation reference signal and receive power of the pathloss estimation reference signal that is obtained after higher-layer filtering, that is, the receive power of the pathloss estimation reference signal needs to be obtained by performing higher-layer filtering for a plurality of times. For example, the terminal device may perform averaging processing or weighting processing on the receive power obtained after higher-layer filtering. This is not limited in embodiments of this application.

For example, the reference signal received power obtained after higher-layer filtering may meet the following formula:

$$F_n = (1-\alpha)*F_{n-1} + \alpha*M_n \quad (2)$$

Herein, $F_n$ is a filtering result, that is, reference signal received power obtained after $n^{th}$ filtering, $F_{n-1}$ is reference signal received power obtained after $(n-1)^{th}$ filtering, and $M_n$ is a measurement result of $n^{th}$ $q_{d1}$. It may be understood that $F_0$ may be $M_1$ for first filtering. In addition, in the formula (2), $\alpha$ may meet the following: $\alpha = \frac{1}{2}^{(ki/4)}$, where ki is a filter coefficient (filter coefficient) configured by the network device by using RRC signaling.

203: The terminal device determines transmit power of an uplink signal based on the pathloss estimation value.

Specifically, the terminal device may obtain the transmit power of the uplink signal according to the formula (1). For example, if the uplink signal is a PUSCH, the terminal device may obtain transmit power of the PUSCH according to the formula (1).

For another example, if the uplink signal is an SRS, transmit power of the SRS may meet the following formula:

$$P_{SRS,b,f,c}(i, q_S, l) = \min \begin{cases} P_{CMAX,f,c}(i), \\ P_{O\_SRS,b,f,c1}(q_S) + 10*\log_{10}(2^\mu * M_{RB,b,f,c}^{SRS}(i)) + \\ \partial_{b,f,c}(q_S) * PL_{b,f,c}(q_d) + \Delta_{TF,b,f,c}(i) + f_{b,f,c}(i, l) \end{cases} \quad (3)$$

For specific descriptions of the formula (2), refer to the formula (1). Details are not described herein again.

For another example, if the uplink signal is a PRACH, transmit power of the PRACH may meet the following formula:

$$P_{PRACH,b,f,c}(i) = \min\{P_{CMAX,f,c}(i), P_{PRACH,target,f,c} + PL_{b,f,c}\} \quad (4)$$

Herein, $P_{PRACH,target,f,c}$ is target power configured by the network device, and $PL_{b,f,c}$ is a synchronization signal block (synchronization signal block, SSB) associated with the PRACH, to serve as the pathloss estimation reference signal by default. However, in embodiments of this application, the pathloss estimation reference signal used to determine the pathloss estimation value of the PRACH is not limited to the SSB, and may alternatively be the pathloss estimation reference signal described in embodiments of this application (that is, the pathloss estimation reference signal indicated in the MAC CE signaling).

For another example, if the uplink signal is a PUCCH, transmit power of the PUCCH may meet the following formula:

$$P_{PUCCH,b,f,c}(i,q_u,q_d,l) = P_{CMAX,f,c}(i), \min\{P_{O\_PUCCH,b,f,c}(q_u) + 10*\log_{10}(2^\mu * M1_{RB,b,f,c}^{PUCCH}(i)) + \}PL_{b,f,c}(q_d) + \Delta_{F\_PUCCH}(F) + \Delta_{TF,b,f,c}(i) + g_{b,f,c}(i,l) \quad (5)$$

Herein, a last item $g_{b,f,c}(i,l)$ is similar to that in the formula (1), and details are not described herein again. $\Delta_{F\_PUCCH}(F)$ is a PUCCH-specific adjustment amount, and F is a PUCCH format.

It may be understood that, for a formula that transmit power of an uplink signal of another type meets, refer to the formula (1) to the formula (4). Details are not described herein. The uplink signal of another type may further include a PUCCH-DMRS, a PUSCH-DMRS, a PTRS, or the like.

204: The terminal device sends the uplink signal at the determined transmit power after the pathloss estimation value takes effect.

An effective time of the pathloss estimation value is not later than n+X+T, n is a time for sending feedback information, the feedback information is used to feed back whether the MAC CE is correctly received, X is fixed duration, and T is variable duration.

In embodiments of this application, that the effective time is not earlier than n+X and not later than n+X+T may be understood as that the terminal device may perform higher-layer filtering for a plurality of times at a time not earlier than n+X and not later than n+X+T, to obtain reference signal received power obtained after filtering. However, at a time not earlier than n+X+T, the terminal device may use the pathloss estimation value, or it is understood that the terminal device uses the pathloss estimation value to determine the transmit power of the uplink signal. That is, the terminal device can adjust uplink transmit power by using the pathloss estimation reference signal indicated by the MAC CE, to send the uplink signal. In other words, after the pathloss estimation value takes effect, the terminal device may use a new pathloss estimation value to calculate the transmit power of the uplink signal. It should be noted that the effective time may be at n+X, or may be after n+X and before n+X+T, or may be at n+X+T. Time node division is not limited in embodiments of this application. In addition, a time at which the terminal device applies the pathloss estimation value may be at n+X+T, or may be after n+X+T.

Specifically, a time at which the terminal device sends the feedback information may be understood as a moment at which the terminal device sends the feedback information, or may be understood as a slot (slot) in which the terminal device sends the feedback information, or may be understood as a mini-slot in which the terminal device sends the feedback information, or may be understood as an orthogonal frequency division multiplexing (orthogonal frequency division multiplexing, OFDM) symbol on which the terminal device sends the feedback information. A time unit represented by n is not limited in embodiments of this application. Optionally, n may be an uplink slot, or may be a downlink slot corresponding to the uplink slot. It may be understood that, when the terminal device sends a plurality of pieces of feedback information, n may be a moment or a slot of a last piece of feedback information, or the like.

Figure 3:
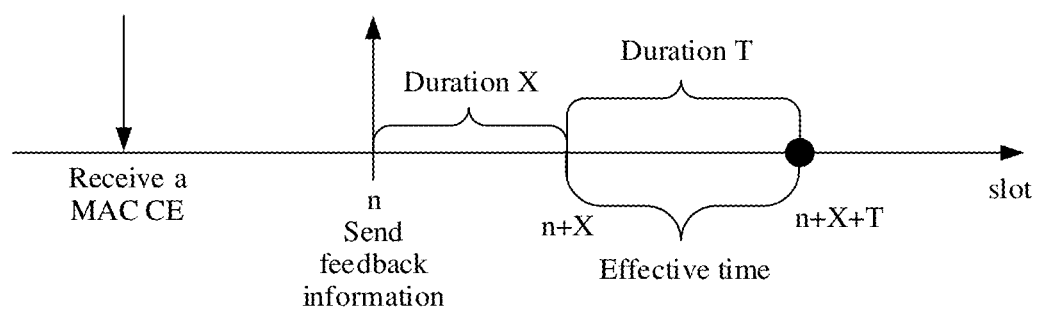
FIG. 3 is a schematic diagram of an effective time according to an embodiment of this application.

As shown in FIG. 3, in a slot n, the terminal device sends the feedback information to the network device, and the duration X may be duration in which the terminal device interprets the MAC CE signaling. The terminal device obtains content of the MAC CE signaling through interpretation, and determines that the MAC CE signaling requires the terminal device to update the pathloss estimation reference signal, so that the terminal device can perform measurement based on the pathloss estimation reference signal indicated by the MAC CE signaling, to obtain RSRP. It may be understood that the interpretation operation performed by the terminal device in the X duration is merely an example. In the duration, the terminal device may further simultaneously perform another operation, such as beam adjustment, panel adjustment, radio frequency adjustment, and buffer processing.

Optionally, after the pathloss estimation value takes effect, the transmit power of the uplink signal may be obtained. Therefore, the effective time of the pathloss estimation value may be equivalent to an effective time of the transmit power of the uplink signal. The feedback information may be understood as a hybrid automatic repeat request (hybrid automatic repeat request) message, that is, an acknowledgement (acknowledgement, ACK) or a negative acknowledgement (negative acknowledgement, NACK) may be fed back to the network device by using the feedback information, to indicate whether the MAC CE signaling is correctly received. A specific format of the feedback information or the like is not limited in embodiments of this application.

Specific descriptions of X and T may be as follows:

X is fixed duration. For example, X may be 3 ms. It may be understood that X is fixed duration for the terminal device 1. However, for different terminal devices such as the terminal device 1 and the terminal device 2, X is variable duration. In other words, X may be different for different terminal devices, but may be fixed duration for a same terminal device. Optionally, X may be related to a capability of the terminal device. For example, the terminal device may report X, and X may include 1 ms, 2 ms, or 3 ms. Optionally, when a unit of X is a slot, X is further related to a subcarrier spacing. For example, if the subcarrier spacing is 15 kHz, X may be three slots. For another example, if the subcarrier spacing is 120 kHz, X may be 24 slots. It may be understood that, although a slot value of X may change, an absolute time corresponding to X is 3 ms. Optionally, the terminal device may further report different capabilities based on different subcarrier spacings. For example, if the subcarrier spacing is 15 kHz, X is three slots. If the subcarrier spacing is 120 kHz, X is 25 slots. It may be understood that absolute times represented by X in two cases are different. Optionally, X may be a length of an uplink slot (which may also be understood as a quantity of uplink slots), or may be a length of a downlink slot (which may also be understood as a quantity of downlink slots). Whether subcarrier spacings of the uplink slot and the downlink slot are the same is not limited. Optionally, T may be a length of an uplink slot, that is, a quantity of uplink slots, or may be a length of a downlink slot, that is, a quantity of downlink slots, or may be a length of an absolute time, or the like. How to measure a length of T is not limited in embodiments of this application.

It should be noted that a subcarrier spacing for uplink transmission and a subcarrier spacing for downlink transmission of the terminal device may be different, that is, a length of an uplink slot and a length of a downlink slot may be different, that is, a number of the uplink slot and a number of the downlink slot may be different. Therefore, when determining a time in a form of n+X+T, the terminal device may consider a conversion relationship between an uplink slot and a downlink slot, or may determine a conversion relationship between an absolute time such as "millisecond" and a slot length. Optionally, the time may be converted into an absolute time, for example, the formula is used after the time is converted into "millisecond".

Optionally, because the terminal device measures a downlink signal according to the indication of the MAC CE signaling to estimate the pathloss estimation value, the terminal device may further convert the time n+X+T into a downlink slot, and then use the time n+X+T. A specific conversion example is as follows: If n is an uplink slot number, X is a time length counted by a quantity of uplink slots, and T is a time length counted by a quantity of downlink slots, n is converted into a downlink slot number, and X is converted into a time length counted by a downlink slot.

A method for converting an uplink slot z to a downlink slot y may meet the following formula:

$$y=\lfloor z*(2^{\mu_{DL}}/2^{\mu_{UL}})\rfloor \quad (6)$$

Herein, $\lfloor\ \rfloor$ is a round-down symbol. $\mu_{UL}$ and $\mu_{DL}$ are uplink and downlink system parameter configurations. Similarly, a quantity of uplink slots may also be converted into a quantity of downlink slots according to a similar formula. It may be understood that y and z in the formula (5) are merely examples.

Optionally, because the terminal device may also adjust the transmit power of the uplink signal according to the indication of the MAC CE signaling, the terminal device may also convert the time n+X+T into an uplink slot, and then use the time n+X+T. A specific conversion example is as follows: If n is an uplink slot number, X is a time length counted by a quantity of uplink slots, and T is a time length counted by a quantity of downlink slots, T is converted into a time length counted by a quantity of uplink slots.

Optionally, T may be a sum of duration in which the terminal device performs higher-layer filtering to obtain the receive power of the pathloss estimation reference signal, and duration in which the terminal device determines the transmit power of the uplink signal based on the pathloss estimation value. Optionally, T is related to network configuration information and/or capability information of the terminal device, and the capability information of the terminal device includes higher-layer filtering capability information of the terminal device. The capability information of the terminal device is used to indicate a capability of the terminal device. The terminal device needs to report the capability information of the terminal device to a network device. The higher-layer filtering capability information of the terminal device includes at least one of higher-layer filtering configuration information, a quantity of measurements, a measurement periodicity, a measurement setting, or time domain information of the pathloss estimation reference signal. The quantity of measurements is a quantity of measurements of receive power of the pathloss estimation reference signal, the measurement periodicity is a transmission periodicity of the pathloss estimation reference signal, and the measurement setting is a setting related to the pathloss estimation reference signal. The network configuration information includes at least one of higher-layer filtering configuration information, a quantity of measurements, a measurement periodicity, a measurement setting, or time domain information of the pathloss estimation reference signal. That is, the information is information configured by the network device, or the information is information predefined in a protocol. It may be understood that whether the network configuration information is configured based on the higher-layer filtering capability information of the terminal device is not limited in embodiments of this application.

The higher-layer filtering configuration information includes a filter coefficient α, where $\alpha=\frac{1}{2}^{(ki/4)}$, and ki is a filter coefficient (filter coefficient) configured by the network device by using RRC signaling. The quantity of measurements is a quantity of times, for example, once, twice, three times, or four times, that a pathloss estimation reference signal is measured based on a stable pathloss estimation value that is predefined in a protocol, configured in a network, or reported by the terminal device. The measurement periodicity is a sending periodicity in which the network device sends the pathloss estimation reference signal and/or a measurement periodicity in which the terminal performs measurement based on the pathloss reference signal, and is predefined in a protocol, configured in a network, or reported by the terminal device. The measurement setting is a measurement-related limitation predefined in a protocol, configured in a network, or reported by the terminal device, and includes a measurement time window (measurement time window), a discontinuous reception (discontinuous reception, DRX) configuration, and the like. For example, if the measurement time window is W, measurement behavior of the terminal device may be limited to one time window. For example, T=max (Quantity of measurements*Measurement periodicity, W). For another example, a discontinuous reception cycle is T-DRX (that is, a DRX cycle). In this case, to prevent the terminal device from entering a sleep state before the terminal device obtains the receive power of the pathloss estimation reference signal through measurement, measurement behavior of the terminal device may not exceed one Opportunity for DRX (a discontinuous reception cycle). Therefore, T=max(Quantity of measurements*Measurement periodicity, TDRX). The time domain information of the pathloss estimation reference signal may indicate whether the pathloss reference signal is periodically sent, semi-persistently sent, or aperiodically sent. For example, if the pathloss reference signal is sent aperiodically, T is related to a trigger time of the aperiodic reference signal. For example, the pathloss estimation value may be performed after the aperiodic reference signal is sent, so that the terminal device can effectively obtain the pathloss estimation reference signal through measurement. In other words, transmission and measurement of the aperiodic reference signal may be included from n+X to n+X+T. It may be understood that the foregoing descriptions of the information are merely an example. In a future communications system or another field, the foregoing information may have other definitions. This is not limited in embodiments of this application.

Optionally, T may be further related to a scaling factor (scaling factor), for example, a scaling factor determined based on N and/or P. N is related to a quantity of receive beams of the terminal device, or N may be directly configured by the network device, and is related to a type of the pathloss estimation reference signal. For example, if the pathloss estimation reference signal is an SSB, N=8. For another example, if the pathloss estimation reference signal is a CSI-RS, N=1. Alternatively, N may be related to whether the pathloss estimation reference signal indicated by the MAC CE signaling belongs to the pathloss estimation reference signal configured by the RRC. For example, if the pathloss estimation reference signal indicated by the MAC CE belongs to the pathloss estimation reference signal configured by the RRC, it indicates that the terminal device keeps measuring the pathloss estimation reference signal and performing filtering on a measurement result. In this case, N=0. P is an adjustment amount configured by the network device, for example, P=3. A meaning of the scaling factor may be as follows: T=N*P*Measurement periodicity*Quantity of measurements.

In embodiments of this application, the effective time of the pathloss estimation value is not earlier than n+X and not later than n+X+T. That is, the terminal device avoids a case in which filtering cannot be performed on the receive power of the pathloss estimation reference signal for a plurality of times in a short time. Therefore, the terminal device can have sufficient time to perform filtering on the receive power of the pathloss estimation reference signal for a plurality of times, to determine the pathloss estimation value. In addition, the terminal device can determine the pathloss estimation value in time. This improves stability of determining the pathloss estimation value.

To further understand the power adjustment method provided in embodiments of this application, the following uses a specific scenario as an example for description. An example in which the uplink signal is an SRS is used to describe the power adjustment method. It may be understood that, for method steps in this specific scenario, refer to descriptions in the foregoing embodiment. The following describes content in the MAC CE signaling in detail, and a step performed by the terminal device varies with content in the MAC CE signaling.

It may be understood that a pathloss estimation reference signal of the SRS is generally configured at a level of an SRS resource set, that is, each SRS resource set (SRS-resource set) may include one or more SRS resources (SRS-resource). Therefore, each SRS resource may correspond to one pathloss estimation reference signal, or each SRS resource set may correspond to one pathloss estimation reference signal, or the like.

Scenario 1: The MAC CE signaling includes information about the pathloss estimation reference signal.

The MAC CE signaling may include an identifier of the pathloss estimation reference signal. By using the identifier of the pathloss estimation reference signal, the terminal device can clearly learn of a specific pathloss estimation reference signal based on which a pathloss estimation value is estimated.

Optionally, the MAC CE signaling may further include carrier component (carrier component, CC) information and bandwidth part (bandwidth part, BWP) information of the pathloss estimation reference signal. By using the CC and the BWP of the pathloss estimation reference signal, the terminal device can learn of a frequency domain location of the pathloss estimation reference signal.

Optionally, to enable the terminal device to learn of a specific uplink signal for which the pathloss estimation value obtained based on the pathloss estimation reference signal is used, the MAC CE signaling may further include an identifier of a target SRS resource, a target SRS resource set, or a target SRS resource group. By using the identifier of the target SRS resource, the target SRS resource set, or the target SRS resource group, the terminal device can learn that the pathloss estimation value is used for an SRS resource in the SRS resource set, or the terminal device can learn of a specific SRS resource set (a specific SRS resource group) for which the pathloss estimation value is be used. This improves consistency of information interpretation. The MAC CE signaling may further include CC information and BWP information of the target SRS resource, the target SRS resource set, or the target SRS resource group. By using the CC information and the BWP information of the target SRS resource, the target SRS resource set, or the target SRS resource group, the terminal device can learn of a frequency domain location of the target SRS resource, the target SRS resource set, or the target SRS resource group.

It should be noted that, when the uplink signal is another signal such as a PUCCH, the MAC CE signaling may also include an identifier of a target PUCCH resource, a target PUCCH resource set, or a target PUCCH resource group. For related descriptions of the target PUCCH resource, the target PUCCH resource set, or the target PUCCH resource group, refer to the descriptions of the target SRS resource, the target SRS resource set, or the target SRS resource group. That is, the content included in the MAC CE may further include the identifier of the pathloss estimation reference signal, the CC information and the BWP information of the pathloss estimation reference signal, the identifier of the target PUCCH resource, the target PUCCH resource set, or the target PUCCH resource group, and the CC information and the BWP information of the target PUCCH resource, the target PUCCH resource set, or the target PUCCH resource group.

However, when the uplink signal is a PUSCH, the MAC CE signaling includes a mapping relationship from a sounding reference signal resource indicator codepoint (SRS resource indicator codepoint, SRI codepoint) to a pathloss estimation reference signal. Therefore, the terminal device may determine the pathloss estimation reference signal based on the MAC CE signaling and an SRI codepoint in downlink control information (downlink control information, DCI). It may be understood that, for other content included in the MAC CE signaling, refer to the foregoing embodiment. Details are not described herein again.

Therefore, when the MAC CE signaling indicates that a pathloss estimation reference signal corresponding to an uplink signal needs to be updated, the MAC CE signaling may include an identifier of the pathloss estimation reference signal and an identifier of the uplink signal. Optionally, the MAC CE signaling may further include CC information and BWP information of the pathloss estimation reference signal, and CC information and BWP information of the uplink signal.

Optionally, when the MAC CE signaling indicates that pathloss estimation reference signals corresponding to at least two uplink signals need to be updated, in an example, the at least two uplink signals include a first uplink signal and a second uplink signal, a pathloss estimation reference signal corresponding to the first uplink signal is a first pathloss estimation reference signal, and a pathloss estimation reference signal corresponding to the second uplink signal is a second pathloss estimation reference signal. In this case, the MAC CE signaling may include an identifier of the first uplink signal, an identifier of the first pathloss estimation reference signal, an identifier of the second uplink signal, and an identifier of the second pathloss estimation reference signal. Optionally, the MAC CE signaling may further include CC information and BWP information of the first uplink signal, CC information and BWP information of the first pathloss estimation reference signal, CC information and BWP information of the second uplink signal, and CC information and BWP information of the second pathloss estimation reference signal. How the MAC CE signaling indicates that the first pathloss estimation reference signal corresponds to the first uplink signal and how the MAC CE signaling indicates that the second pathloss estimation reference signal corresponds to the second uplink signal are not limited in embodiments of this application.

It may be understood that a header (header) of the MAC CE signaling may further include a logical channel identity (logical channel identity, LCID), and the LCID may be used to indicate that the MAC CE is used to update the pathloss estimation reference signal. That is, the terminal device may learn of a function of the MAC CE signaling by using the LCID. For example, the terminal device may learn that the MAC CE signaling is used to update the pathloss estimation reference signal.

In embodiments of this application, the network device sends the MAC CE signaling to the terminal device, so that after receiving the MAC CE signaling, the terminal device can learn, by interpreting the MAC CE signaling, that the pathloss estimation reference signal is updated, so as to estimate the pathloss estimation value based on a new pathloss estimation reference signal. Therefore, the terminal device may obtain the pathloss estimation value based on the pathloss estimation reference signal, and after the pathloss estimation value takes effect, determine the transmit power of the uplink signal by using the pathloss estimation value.

In embodiments of this application, it is ensured that the terminal device has sufficient time to measure the pathloss estimation value based on the updated pathloss estimation reference signal, to further determine the transmit power of the uplink signal.

Optionally, the MAC CE signaling may further include a parameter related to the transmit power of the uplink signal. That is, in addition to the information about the pathloss estimation reference signal, the MAC CE signaling may further include at least one of target power, a pathloss compensation factor, or a power adjustment parameter. The formula (1) is used as an example, and the MAC CE signaling may include one or more of $P_{O\text{-}PUSCH,b1,f1,c1}(j1)$, $\partial_{b1,f1,c1}(j1)$, or $f_{b1,f1,c1}(i1,l1)$. The formula (2) is used as an example, and the MAC CE signaling may include one or more of $P_{O\text{-}SRS,b,f,c1}(q_S)$, $\partial_{b,f,c}(q_S)$, or $f_{b,f,c}(i,l)$. It should be understood that, for specific descriptions of the parameters, refer to the foregoing embodiments. Details are not described herein again.

That is, in addition to the information about the pathloss estimation reference signal, the MAC CE signaling may further include another parameter related to the transmit power of the uplink signal, and the parameter related to the transmit power of the uplink signal may be another parameter, or may be a parameter of another type, or the like. No enumeration is provided in embodiments of this application.

Figure 4:
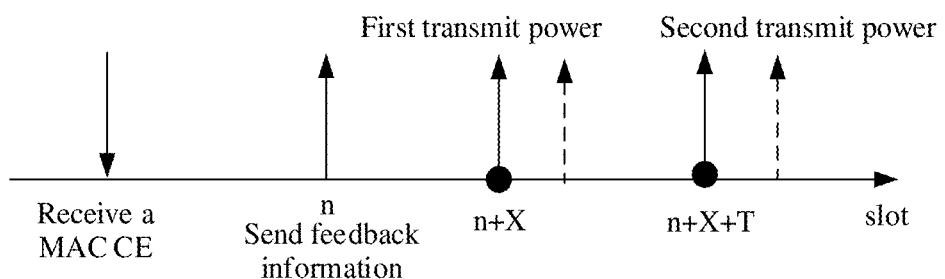
FIG. 4 is a schematic diagram of an uplink signal sending time according to an embodiment of this application.

In embodiments of this application, the network device sends the MAC CE signaling to the terminal device, so that after receiving the MAC CE signaling, the terminal device can learn, by interpreting the MAC CE signaling, that the pathloss estimation reference signal is updated, so as to estimate the pathloss estimation value based on a new pathloss estimation reference signal. Therefore, the terminal device may obtain the pathloss estimation value based on the pathloss estimation reference signal. For example, after the time n+X+T, the terminal device may determine the transmit power of the uplink signal based on the pathloss estimation value (that is, the pathloss estimation value estimated by using the pathloss estimation reference signal in the MAC CE signaling) and the parameter related to the transmit power of the uplink signal. For example, FIG. 4 is a schematic diagram of an effective time according to an embodiment of this application. Because higher-layer filtering may not be performed on the parameter related to the transmit power of the uplink signal, after the terminal device obtains another parameter in the MAC CE signaling through interpretation, the terminal device may first determine, after an effective time of the parameter (excluding the pathloss estimation value) related to the transmit power of the uplink signal, for example, after the time n+X (or at the time n+X), that the transmit power of the uplink signal is, for example, first transmit power. It may be understood that a pathloss estimation value corresponding to the first transmit power is a previous pathloss estimation value, that is, a pathloss estimation value estimated by the terminal device by using a pathloss estimation reference signal before the network device sends the MAC CE signaling. Further, within an effective time of the pathloss estimation value, for example, after the time n+X+T (or at the time n+X+T), it is determined that the transmit power of the uplink signal is, for example, second transmit power. A pathloss estimation value corresponding to the second transmit power is a new pathloss estimation value, that is, a pathloss estimation value estimated by using a pathloss estimation reference signal in the MAC CE signaling sent by the network device.

In embodiments of this application, it is ensured that the terminal device has sufficient time to measure the pathloss estimation value based on the updated pathloss estimation reference signal, to further determine the transmit power of the uplink signal.

In the foregoing scenario, the MAC CE directly indicates the pathloss estimation reference signal. However, during specific implementation, the MAC CE may not indicate the pathloss estimation reference signal, but indicates the pathloss estimation reference signal by using other information. For this case, refer to a scenario 2 and a scenario 3.

Scenario 2: The MAC CE signaling includes information about a reference signal of an uplink transmit beam.

The MAC CE signaling may be used to indicate to update the uplink transmit beam. Specifically, the MAC CE signaling may include an identifier of the reference signal of the uplink transmit beam, and CC information and BWP information of the reference signal of the uplink transmit beam.

For example, FIG. 5 is a schematic diagram of a format of a MAC CE according to an embodiment of this application. Meanings represented by various fields are as follows:

A/D: The field may have a length of one bit, and if the field is set to 1, it indicates that the field is activated, or if the field is set to 0, it indicates that the field is deactivated. Specifically, when the field is set to 1, it may indicate that the MAC CE signaling is used to indicate to update the uplink transmit beam.

SRS resource set cell ID (Cell ID): The field may have a length of five bits, and may indicate a CC of an SRS resource set. If a C field in FIG. 5 is 0, the field may also indicate a CC of a resource represented by a resource ID in FIG. 5.

SRS resource set BWP ID: The field has a length of two bits, and may indicate a BWP of an SRS resource set. If a C field in FIG. 5 is 0, the field may also indicate a BWP of a resource represented by a resource ID in FIG. 5.

C: The field may have a length of one bit, and if the field is set to 1, it indicates that a resource serving cell IDi field and a resource BWP IDi field in FIG. 5 exist, or if the field is set to 0, it indicates that the resource serving cell IDi field and the resource BWP IDi field do not exist.

SUL: The field may have a length of one bit, and if the field is set to 1, it indicates SUL, or if the field is set to 0, it indicates NUL.

SP SRS resource set ID: The field may have a length of four bits, and may indicate an ID of a target SRS resource set.

Fi: The field may have a length of one bit, and may indicate a type of a reference resource of a spatial relation (spatial relation). If the field is set to 0, it may indicate that a resource IDi in the figure indicates an ID of an SRS resource or an SSB ID, or if the field is set to 1, it may indicate that the resource IDi in the figure indicates an ID of a channel state information reference signal (channel state information reference signal, CSI-RS) resource. It may be understood that the field exists only when the A/D field is set to 1.

Resource IDi: The field may have a length of seven bits, and may indicate an identifier of a reference resource of a spatial relation. When the Fi field is set to 0, the first bit of the resource IDi may be used to distinguish from an SRS or a synchronization signal block (synchronization signal block, SSB), and the last six bits may indicate an ID of an SRS resource or an SSB ID. When the Fi field is set to 1, the seven bits of the resource IDi field indicate an ID of a CSI RS resource. It may be understood that the field exists only when the A/D field is set to 1.

Resource serving cell (resource serving cell) IDi: The field may have a length of five bits, and may indicate a CC of the resource IDi field.

Resource BWP IDi: The field may have a length of two bits, and may indicate a BWP of the resource IDi field.

R: Reserved field.

Further, the MAC CE signaling may include an identifier indicating whether the pathloss estimation reference signal is updated. Optionally, the identifier (that is, an identifier indicating whether the pathloss estimation reference signal is updated) may have a length of one bit. Optionally, the one bit may be one bit newly added to the MAC CE signaling shown in FIG. 5, or the one bit may be one bit in an R field or a combination of a plurality of R fields in FIG. 5. When the identifier is "yes", for example, when a related field is set to 1, it indicates that the MAC CE is used to update the pathloss estimation reference signal. When the identifier is "no", for example, when a related field is set to 0, it indicates that the MAC CE is not used to update the pathloss estimation reference signal.

The MAC CE signaling may further include an identifier indicating whether the pathloss estimation reference signal exists. Optionally, the identifier (that is, an identifier indicating whether the pathloss estimation reference signal exists) may have a length of one bit. Optionally, the one bit may be one bit added to the MAC CE signaling shown in FIG. 5, or the one bit may be one bit in an R field or a combination of a plurality of R fields in FIG. 5. When the identifier is "yes", for example, when a related field is set to 1, it indicates that the MAC CE includes an identifier of the pathloss estimation reference signal. When the identifier is "no", for example, when a related field is set to 0, it indicates that the MAC CE does not include the identifier of the pathloss estimation reference signal. In this case, the terminal device may update the pathloss reference signal with reference to a reference signal of a spatial relation.

It may be understood that the identifier of the pathloss estimation reference signal may exist when the pathloss estimation reference signal exists in the MAC CE signaling, that is, the identifier of the pathloss estimation reference signal may exist when "the identifier indicating whether the pathloss estimation reference signal exists" in the MAC CE is "yes". Optionally, the MAC CE may include an identifier of one pathloss estimation reference signal or identifiers of a plurality of pathloss estimation reference signals. For example, if the MAC CE includes an identifier of one pathloss estimation reference signal, it may indicate that, for transmit power of all SRS resources in an SRS resource set corresponding to an SRS resource set ID indicated by the MAC CE, refer to the indicated pathloss estimation reference signal. For another example, if the MAC CE includes identifiers of a plurality of pathloss estimation reference signals, it may indicate that, for transmit power of all SRS resources in an SRS resource set corresponding to an SRS resource set ID indicated by the MAC CE, sequentially refer to the plurality of indicated pathloss estimation reference signals. It may be understood that the foregoing correspondence between a pathloss estimation reference signal and an SRS resource set is merely an example. During specific implementation, another indication method may alternatively be used.

Optionally, in the following scenario, the MAC CE may include the pathloss estimation reference signal, that is, in the following scenario, "an identifier indicating whether the pathloss estimation reference signal exists" in the MAC CE is yes. For example, a scenario in which the MAC CE includes the pathloss estimation reference signal may include one or more of the following:

A reference signal of a spatial relation (spatial relation) is an aperiodic reference signal. Because a measurement occasion of the aperiodic reference signal may be once, the aperiodic reference signal is not suitable for estimating the pathloss estimation value. Optionally, the reference signal of the spatial relation is a semi-persistent reference signal.

Reference signals of spatial relations of different SRS resources are different. If a pathloss estimation reference signal of each SRS resource changes with the reference signal of the spatial relation, pathloss estimation of different SRS resources may be different, and therefore transmit power of different SRSs may be different. This increases implementation complexity of the terminal device, and causes power imbalance between different transmit ports. Therefore, transmit power of a plurality of SRS resources in one SRS resource set may be consistent. Therefore, in this scenario, a pathloss estimation reference signal per (per) SRS resource set may be indicated.

The reference signal of the spatial relation is an uplink reference signal. The uplink reference signal cannot be used as the pathloss estimation reference signal. Therefore, in this scenario, the MAC CE may include the pathloss estimation reference signal. Optionally, in this scenario, the terminal device may search for a spatial relation of the uplink reference signal based on a configuration of the uplink reference signal, that is, find a downlink reference signal according to a "chain rule", and use the downlink reference signal as the pathloss estimation reference signal.

It may be understood that the pathloss estimation reference signal is related to the reference signal of the uplink transmit beam. In other words, the terminal device may measure RSRP (receive power obtained after higher-layer filtering) based on the reference signal of the uplink transmit beam, to obtain the pathloss estimation value. Optionally, the MAC CE signaling may further include an identifier of a target SRS resource or a target SRS resource set. Optionally, a header (header) of the MAC CE signaling may include an LCID. For specific descriptions of the LCID, and the identifier of the target SRS resource or the target SRS resource set, refer to the foregoing embodiment. Details are not described herein.

It may be understood that, when the uplink signal sent by the terminal device is a PUSCH, a transmit beam of the PUSCH may be determined by using an uplink transmit beam of an SRS resource indicated by an SRI in DCI. Optionally, transmit power of the PUSCH may be determined based on a pathloss estimation reference signal associated with (or corresponding to) an SRI codepoint in the DCI. That is, if the uplink transmit beam of the SRS resource indicated by the sounding reference signal resource indicator (SRS resource indicator, SRI) in the DCI for scheduling the PUSCH changes, the uplink transmit beam of the PUSCH also needs change. In this case, the pathloss estimation reference signal used to determine the transmit power of the PUSCH also needs to change correspondingly. Therefore, the MAC CE in the scenario 2 may further include information indicating whether the MAC CE is also used to update the pathloss estimation reference signal used to determine the transmit power of the PUSCH. If yes, the terminal device may determine the pathloss estimation reference signal of the PUSCH by using the uplink beam of the SRS resource indicated by the SRI. Optionally, an effective time may not be later than n+X+T. If no, the terminal device may determine the pathloss estimation reference signal of the PUSCH by using the mapping relationship between the SRI codepoint and the pathloss estimation reference signal.

In embodiments of this application, the network device sends the MAC CE signaling to the terminal device, so that after receiving the MAC CE signaling, the terminal device can learn, by interpreting the MAC CE signaling, that the uplink transmit beam is updated. Therefore, the terminal device may estimate the pathloss estimation value based on the reference signal of the uplink transmit beam included in the MAC CE signaling, and update the uplink transmit beam based on the MAC CE signaling. For example, after the time n+X+T, the terminal device may determine the transmit power of the uplink signal based on the pathloss estimation value (that is, the pathloss estimation value estimated by using the reference signal of the uplink transmit beam in the MAC CE signaling). In addition, after the time n+X+T, the terminal device may adjust the uplink transmit beam based on the uplink transmit beam indicated by the MAC CE signaling.

In embodiments of this application, the network device uses simplified signaling (that is, the MAC CE signaling) to indicate the uplink transmit beam in the MAC CE signaling, to further indicate the terminal device to update the uplink transmit beam and the pathloss estimation reference signal. It is ensured that the terminal device has sufficient time to measure the pathloss estimation value based on the updated pathloss estimation reference signal, to further determine the transmit power of the uplink signal.

Scenario 3: The MAC CE signaling includes information about a reference signal of a downlink transmit beam.

The MAC CE signaling may be used to indicate to update an activated TCI (transmission configuration indicator) state. By indicating the activated TCI state, the MAC CE signaling may indirectly indicate to update an uplink transmit beam and a downlink receive beam, and indirectly indicate to update the pathloss estimation reference signal. Specifically, the MAC CE signaling may include one or more activated TCI states, or may include one or more deactivated TCI states. For example, the network device may indicate a beam for data transmission by using the activated TCI state. Therefore, the terminal device may adjust a receive beam based on the activated TCI state, and the terminal device may perform data receiving.

Optionally, the network device may activate one or more TCI states by using the MAC CE signaling, as shown in a signaling format shown in FIG. 6. Herein, Ti represents an $i^{th}$ TCI state configured in the RRC. If Ti=1, it indicates that the TCI state is activated, or if Ti=0, it indicates that the TCI is deactivated. The network device may configure an activated TCI state list for the terminal device by sending the MAC CE. The activated TCI state means that the terminal device needs to measure and maintain the TCI state, including maintaining a beam direction, a receiving weight, a time offset, a frequency offset, and the like corresponding to the TCI state.

Specifically, the terminal device may perform RSRP measurement based on a reference signal in the activated TCI. Optionally, if there are a plurality of activated TCIs, the terminal device may select one or more of the plurality of activated TCIs as the pathloss estimation reference signal. A method for selection by the terminal device is not limited in embodiments of this application. For example, the terminal device may perform selection based on an identifier of the TCI state, or based on a measurement result of the reference signal included in the TCI.

In embodiments of this application, the network device sends the MAC CE signaling to the terminal device, so that after receiving the MAC CE signaling, the terminal device can learn, by interpreting the MAC CE signaling, that the network device needs to update the downlink transmit beam. Therefore, the terminal device may estimate the pathloss estimation value based on the reference signal of the downlink transmit beam included in the MAC CE signaling, and adjust the uplink transmit beam and the downlink receive beam based on the MAC CE signaling. For example, after the time n+X+T (or at the time n+X+T), the terminal device may determine the transmit power of the uplink signal based on the pathloss estimation value (that is, the pathloss estimation value estimated by using the reference signal of the downlink transmit beam in the MAC CE signaling). In addition, after the time n+X+T (or at the time n+X+T), the terminal device may adjust the uplink transmit beam and the downlink receive beam based on the downlink transmit beam indicated by the MAC CE signaling. It may be understood that because of consistency of transmit and receive beams, the terminal device may send the uplink signal by using a beam for receiving a downlink signal.

It should be noted that, in the scenario 2 and the scenario 3, the MAC CE signaling may also include a parameter related to the transmit power of the uplink signal, for example, target power, a pathloss compensation factor, or a power adjustment parameter. For a specific implementation, refer to the foregoing embodiment. Details are not described herein again.

In embodiments of this application, the network device uses simplified signaling, that is, the MAC CE signaling, to indicate to update the downlink transmit beam, to further indicate the terminal device to update the uplink transmit beam, the downlink receive beam, and the pathloss estimation reference signal. It is ensured that the terminal device has sufficient time to measure the pathloss estimation value based on the updated pathloss estimation reference signal, to further determine the transmit power of the uplink signal.

It may be understood that the foregoing embodiments have respective focuses. For an implementation that is not described in detail in one of embodiments, refer to other embodiments. Details are not described herein again. Further, embodiments described in this specification may be independent solutions, or may be combined according to internal logic. All these solutions fall within the protection scope of this application.

It may be understood that, in the foregoing method embodiments, the methods and the operations implemented by the terminal device may alternatively be implemented by a component (for example, a chip or a circuit) that can be used in the terminal device, and the methods and the operations implemented by the network device may alternatively be implemented by a component (for example, a chip or a circuit) that can be used in the network device.

The foregoing mainly describes the solutions provided in embodiments of this application from a perspective of interaction. It may be understood that, to implement the foregoing functions, the network elements such as the terminal device and the network device include a corresponding hardware structure and/or software module that are/is used to perform each function. A person skilled in the art may be aware that, with reference to the examples described in embodiments disclosed in this specification, units and method steps may be implemented by hardware or a combination of hardware and computer software in this application. Whether the functions are performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, function modules of the terminal device or the network device may be divided based on the foregoing method examples. For example, function modules may be divided corresponding to functions, or two or more functions may be integrated into one processing module. The integrated module may be implemented in a form of hardware, or may be implemented in a form of a software functional module. It should be noted that, in embodiments of this application, division into modules is an example and is merely logical function division, and may be other division in an actual implementation. An example in which each functional module is obtained through division based on a corresponding function is used below for description.

Finally, a communications apparatus provided in embodiments of this application is described in detail.

FIG. 7a is a schematic diagram of a structure of a communications apparatus according to an embodiment of this application. The communications apparatus may be a terminal device, or may be a chip. The communications apparatus is configured to perform the power adjustment method described in embodiments of this application. As shown in FIG. 7a, the communications apparatus includes:

a receiving unit 701, configured to receive a medium access control control element MAC CE, where the MAC CE is used to update a pathloss estimation reference signal; and a processing unit 702, configured to determine a pathloss estimation value based on the pathloss estimation reference signal, where an effective time of the pathloss estimation value is not later than n+X+T, n is a time for sending feedback information, the feedback information is used to feed back whether the MAC CE is correctly received, X is fixed duration, and T is variable duration, where the processing unit 702 is further configured to determine transmit power of an uplink signal based on the pathloss estimation value.

In a possible implementation, the communications apparatus further includes a sending unit 703, configured to send the uplink signal at the transmit power after the pathloss estimation value takes effect.

In a possible implementation, T is related to high-layer filtering capability information of a terminal device.

In a possible implementation, the higher-layer filtering capability information includes at least one of higher-layer filtering configuration information, a quantity of measurements, a measurement periodicity, a measurement setting, or time domain information of the pathloss estimation reference signal. The quantity of measurements is a quantity of measurements of receive power of the pathloss estimation reference signal, the measurement periodicity is a transmission periodicity of the pathloss estimation reference signal, and the measurement setting is a setting related to the pathloss estimation reference signal.

In a possible implementation, the MAC CE includes information about the pathloss estimation reference signal.

In a possible implementation, the MAC CE further includes a parameter related to the transmit power of the uplink signal, and the parameter related to the transmit power of the uplink signal includes at least one of target power, a pathloss compensation factor, or a power adjustment parameter.

In a possible implementation, an effective time of the parameter related to the transmit power of the uplink signal is not later than n+X, or an effective time of the parameter related to the transmit power of the uplink signal is not later than n+X+T.

In a possible implementation, the MAC CE includes information about a reference signal of an uplink transmit beam, and the pathloss estimation reference signal is related to the reference signal of the uplink transmit beam.

In a possible implementation, the processing unit 702 is further configured to adjust the uplink transmit beam based on the MAC CE, where an effective time of the uplink transmit beam is not later than n+X, or an effective time of the uplink transmit beam is not later than n+X+T.

In a possible implementation, the MAC CE includes information about a reference signal of a downlink transmit beam, and the pathloss estimation reference signal is related to the reference signal of the downlink transmit beam.

In a possible implementation, the processing unit 702 is further configured to adjust an uplink transmit beam and a downlink receive beam based on the downlink transmit beam, where an effective time of the downlink receive beam and that of the uplink transmit beam are not later than n+X+T; or an effective time of the downlink receive beam is not later than n+X, and an effective time of the uplink transmit beam is not later than n+X+T; or an effective time of the downlink receive beam and that of the uplink transmit beam are not later than n+X.

It should be understood that, when the communications apparatus is a terminal device or a component that implements the foregoing functions in the terminal device, the processing unit 702 may be one or more processors, the sending unit 703 may be a transmitter, and the receiving unit 701 may be a receiver; or the sending unit 703 and the receiving unit 701 are integrated into one component, for example, a transceiver. For example, the receiving unit 701 may receive the MAC CE sent by the network device, and the sending unit 703 may send the uplink signal at the determined transmit power of the uplink signal.

When the communications apparatus is a chip, the processing unit 702 may be one or more processors, the sending unit 703 may be an output interface, and the receiving unit 701 may be an input interface, or the sending unit 703 and the receiving unit 701 are integrated into one unit, for example, an input/output interface, which is also referred to as a communications interface, an interface circuit, an interface, or the like.

It may be understood that, for implementation of the units shown in FIG. 7a, refer to corresponding descriptions in the foregoing embodiment.

FIG. 7b is a schematic diagram of a structure of a communications apparatus according to an embodiment of this application. The communications apparatus may be a network device, or may be a chip. The communications apparatus is configured to perform the power adjustment method described in embodiments of this application. As shown in FIG. 7b, the communications apparatus includes:

a sending unit 710, configured to send a medium access control control element MAC CE to a terminal device, where the MAC CE is used to update a pathloss estimation reference signal.

In a possible implementation, the MAC CE includes information about the pathloss estimation reference signal.

In a possible implementation, the MAC CE further includes a parameter related to the transmit power of the uplink signal, and the parameter related to the transmit power of the uplink signal includes at least one of target power, a pathloss compensation factor, or a power adjustment parameter.

In a possible implementation, the MAC CE includes information about a reference signal of an uplink transmit beam, and the pathloss estimation reference signal is related to the reference signal of the uplink transmit beam.

In a possible implementation, the MAC CE includes information about a reference signal of a downlink transmit beam, and the pathloss estimation reference signal is related to the reference signal of the downlink transmit beam.

It should be understood that, when the communications apparatus is a network device or a component that implements the foregoing functions in the network device, the communications apparatus may further include a processing unit and a receiving unit, which are not shown in the figure. The processing unit may be one or more processors, the sending unit 710 may be a transmitter, and the receiving unit may be a receiver, or the sending unit 710 and the receiving unit are integrated into one component, for example, a transceiver.

When the communications apparatus is a chip, the processing unit may be one or more processors, the sending unit 710 may be an output interface, and the receiving unit may be an input interface, or the sending unit 710 and the receiving unit are integrated into one unit, for example, an input/output interface, which is also referred to as a communications interface, an interface circuit, an interface, or the like.

It may be understood that, for implementation of the units shown in FIG. 7b, refer to corresponding descriptions in the foregoing embodiment.

Figure 8A:
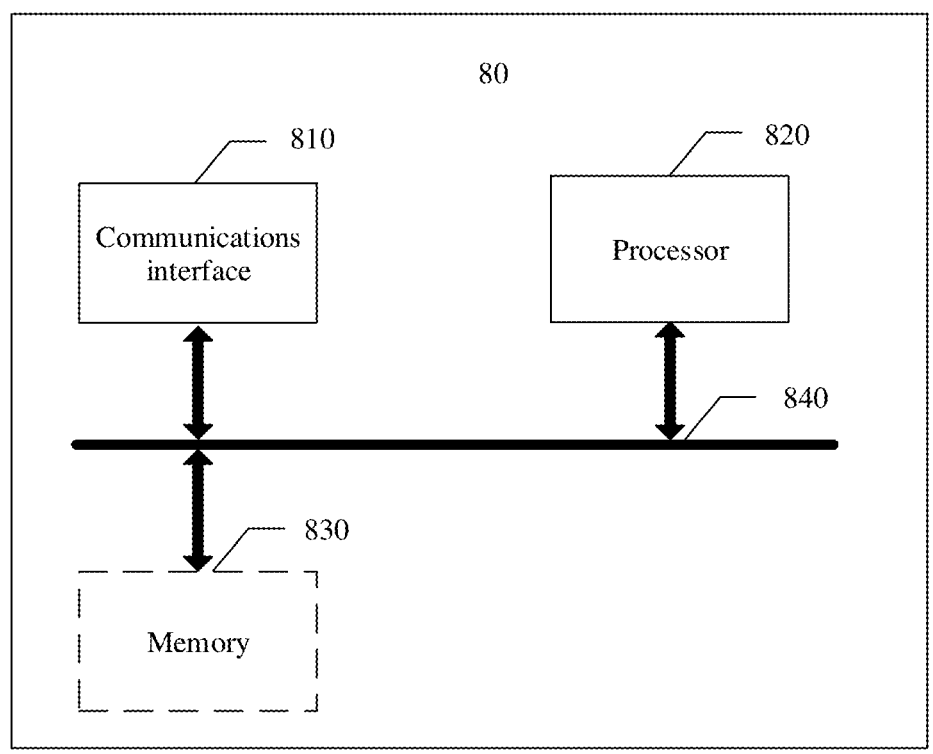
FIG. 8a is a schematic diagram of a structure of a communications apparatus according to an embodiment of this application.

FIG. 8a shows a communications apparatus 80 according to an embodiment of this application, configured to implement a function of the terminal device in the foregoing method. When the function of the terminal device is implemented, the apparatus may be a terminal device, an apparatus in a terminal device, or an apparatus that can be used together with a terminal device. The apparatus may alternatively be a chip system. In embodiments of this application, the chip system may include a chip, or may include a chip and another discrete component. The apparatus 80 includes at least one processor 820, configured to implement a function of the terminal device in the method provided in embodiments of this application. The apparatus 80 may further include a communications interface 810. In embodiments of this application, the communications interface may be a transceiver, a circuit, a bus, a module, or a communications interface of another type, and is configured to communicate with another device by using a transmission medium. For example, the communications interface 810 is used by an apparatus in the apparatus 80 to communicate with another device. The processor 820 receives and sends data through the communications interface 810, and is configured to implement the method in the foregoing method embodiment.

The apparatus 80 may further include at least one memory 830, configured to store program instructions and/or data. The memory 830 is coupled to the processor 820. Coupling in embodiments of this application is indirect coupling or a communication connection between apparatuses, units, or modules, and may be in an electrical, mechanical, or another form, and is used for information exchange between the apparatuses, units, or modules. The processor 820 may cooperate with the memory 830. The processor 820 may execute the program instructions stored in the memory 830. At least one of the at least one memory may be included in the processor.

A specific connection medium between the communications interface 810, the processor 820, and the memory 830 is not limited in embodiments of this application. In embodiments of this application, the memory 830, the communications interface 820, and the communications interface 810 are connected through a bus 840 in FIG. 8a, and the bus is represented by a thick line in FIG. 8a. A connection manner between other components is merely an example for description, and is not limited thereto. The bus may be classified into an address bus, a data bus, a control bus, and the like. For ease of representation, only one thick line is used to represent the bus in FIG. 8a, but this does not mean that there is only one bus or only one type of bus.

When the apparatus 80 is specifically a chip or a chip system, the communications interface 810 may output or receive a baseband signal. When the apparatus 80 is specifically a device, the communications interface 810 may output or receive a radio frequency signal. In embodiments of this application, the processor may be a general-purpose processor, a digital signal processor, an application-specific integrated circuit, a field-programmable gate array or another programmable logic device, a discrete gate or a transistor logic device, or a discrete hardware component, and may implement or perform the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware in the processor and a software module.

Figure 8B:
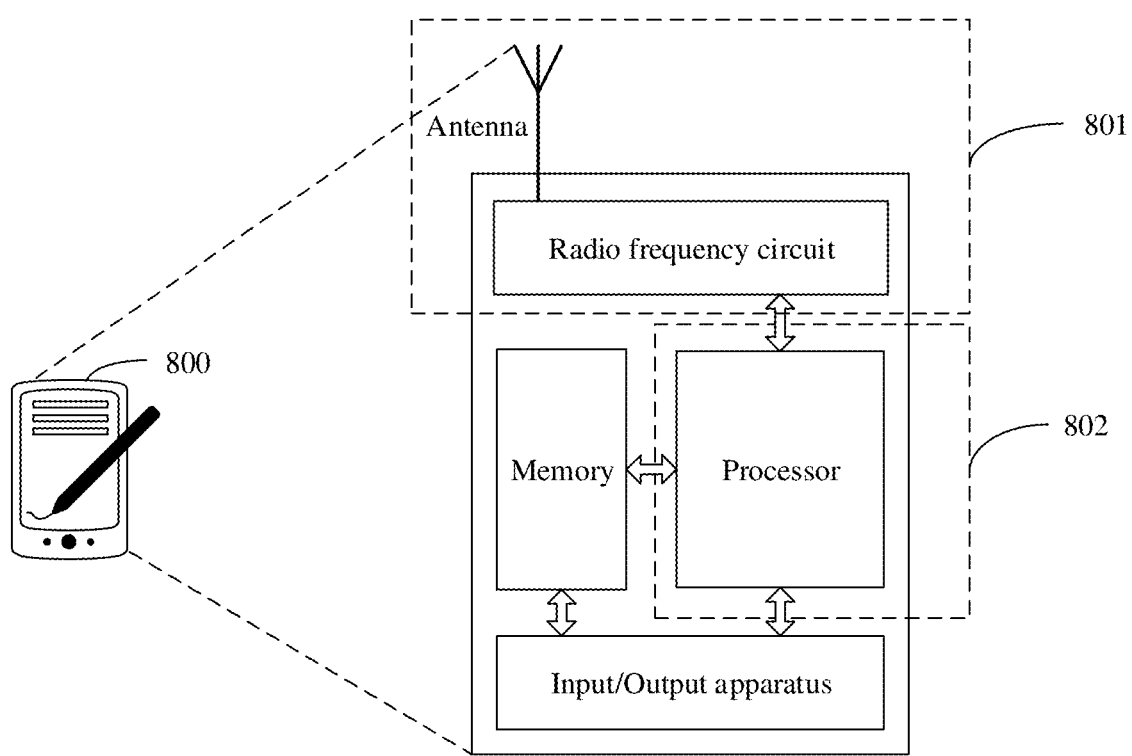
FIG. 8b is a schematic diagram of a structure of a terminal device according to an embodiment of this application.

For example, FIG. 8b is a schematic diagram of a structure of a terminal device 800 according to an embodiment of this application. The terminal device may perform the method shown in FIG. 2, or the terminal device may perform an operation of the terminal device shown in FIG. 7a.

For ease of description, FIG. 8b shows only main components of the terminal device. As shown in FIG. 8b, the terminal device 800 includes a processor, a memory, a radio frequency circuit, an antenna, and an input/output apparatus. The processor is mainly configured to: process a communications protocol and communications data, control the entire terminal device, execute a software program, and process data of the software program, for example, configured to support the terminal device in executing the procedure described in FIG. 2. The memory is configured to store the software program and the data. The radio frequency circuit is mainly configured to: perform conversion between a baseband signal and a radio frequency signal, and process the radio frequency signal. The antenna is mainly configured to send and receive the radio frequency signal in a form of an electromagnetic wave. The terminal device 800 may further include the input/output apparatus, such as a touchscreen, a display, or a keyboard, which is mainly configured to: receive data entered by a user, and output data to the user. It should be noted that some types of terminal devices may not have the input/output apparatus.

After the terminal device is powered on, the processor may read a software program in a storage unit, explain and execute an instruction of the software program, and process data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 8b shows only one memory and only one processor. In an actual terminal device, there may be a plurality of processors and a plurality of memories. The memory may also be referred to as a storage medium, a storage device, or the like. This is not limited in embodiments of this application.

It should be noted that the processor in embodiments of this application may be an integrated circuit chip, and has a signal processing capability. In an implementation process, the steps in the foregoing method embodiment may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, any conventional processor, or the like. The steps of the method disclosed with reference to embodiments of this application may be directly performed by a hardware decoding processor, or may be performed by using a combination of hardware in the decoding processor and a software module. The software module may be located in a mature storage medium in the art, for example, a random access memory, a flash memory, a read-only memory, a programmable read-only memory, an electrically erasable programmable memory, and a register. The storage medium is located in the memory, and the processor reads information in the memory and completes the steps in the foregoing method in combination with hardware of the processor. In an optional implementation, the processor may include a baseband processor and a central processing unit (central processing unit, CPU). The baseband processor is mainly configured to process a communications protocol and communications data. The CPU is mainly configured to: control the entire terminal device, execute a software program, and process data of the software program. Optionally, the processor may alternatively be a network processor (network processor, NP) or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof. The memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories in the systems and method described in this specification include but are not limited to these memories and any memory of another suitable type.

For example, in embodiments of this application, the antenna and the radio frequency circuit that have a transceiver function may be considered as a transceiver unit 801 of the terminal device 800, and the processor having a processing function may be considered as a processing unit 802 of the terminal device 800.

As shown in FIG. 8b, the terminal device 800 may include the transceiver unit 801 and the processing unit 802. The transceiver unit may also be referred to as a transceiver, a transceiver apparatus, or the like. Optionally, a component that is configured to implement a receiving function in the transceiver unit 801 may be considered as a receiving unit, and a component that is configured to implement a sending function in the transceiver unit 801 may be considered as a sending unit. That is, the transceiver unit 801 includes the receiving unit and the sending unit. For example, the receiving unit may also be referred to as a receiver, or a receiver circuit, and the sending unit may be referred to as a transmitter, or a transmitter circuit.

In some embodiments, the transceiver unit 801 and the processing unit 802 may be integrated into one component, or may be separated as different components. In addition, the processor and the memory may be integrated into one component, or may be separated as different components. For example, in an embodiment, the transceiver unit 801 may be configured to perform the method shown in step 201 shown in FIG. 2. For another example, in an embodiment, the transceiver unit 801 may be further configured to perform the method shown in step 204 shown in FIG. 2.

In an embodiment, the processing unit 802 may be further configured to perform the method shown in steps 202 and 203 shown in FIG. 2.

For another example, in an embodiment, the transceiver unit 801 may be further configured to perform the method performed by the sending unit 703 and the receiving unit 701. For another example, in an embodiment, the processing unit 802 may be further configured to perform the method performed by the processing unit 702.

Figure 9:
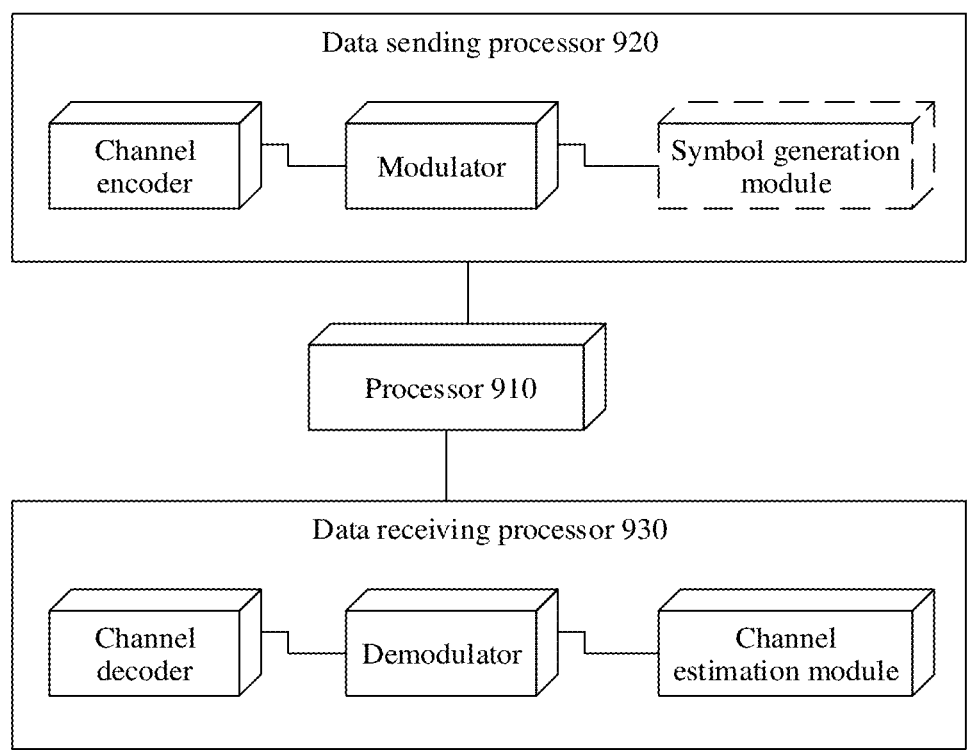
FIG. 9 is a schematic diagram of a structure of a terminal device according to an embodiment of this application.

When the communications apparatus in embodiments of this application is a terminal device, refer to a device shown in FIG. 9. The device includes a processor 910, a data sending processor 920, and a data receiving processor 930. The processing unit 702 in the foregoing embodiment may be the processor 910 in FIG. 9, and implements a corresponding function. The receiving unit 701 in the foregoing embodiment may be the data receiving processor 930 in FIG. 9, and the sending unit 703 may be the data sending processor 920 in FIG. 9. Although FIG. 9 shows a channel encoder and a channel decoder, it may be understood that these modules are merely examples, and do not constitute a limitation on embodiments.

It may be understood that, for an implementation of the terminal device in embodiments of this application, refer to the foregoing embodiments. Details are not described herein again.

It may be understood that, according to the method provided in embodiments of this application, this application further provides a computer program product. The computer program product includes computer program code. When the computer program code is run on a computer, the computer is enabled to perform the method in the embodiment shown in FIG. 2. Further, the computer may be enabled to perform, based on scenarios provided in embodiments of this application, the method shown in FIG. 2.

According to the method provided in embodiments of this application, this application further provides a computer-readable medium. The computer-readable medium stores program code. When the program code is run on a computer, the computer is enabled to perform the method in the embodiment shown in FIG. 2. Further, the computer may be enabled to perform, based on scenarios provided in embodiments of this application, the method shown in FIG. 2.

According to the method provided in embodiments of this application, this application further provides a system, including the foregoing terminal device and the foregoing network device.

All or some of embodiments may be implemented by using software, hardware, firmware, or any combination thereof. When the software is used for implementation, all or some of embodiments may be implemented in a form of a computer program product. The computer program product includes one or more computer instructions. When the computer instructions are loaded and executed on the computer, all or some of the procedure or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a high-density digital video disc (digital video disc, DVD)), a semiconductor medium (for example, a solid-state drive (solid-state drive, SSD)), or the like.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using the figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

A person of ordinary skill in the art may be aware that, various illustrative logical blocks (illustrative logical blocks) and steps (steps) that are described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working procedure of the foregoing system, apparatus, and unit, refer to a corresponding procedure in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power adjustment method, wherein the method comprises:
    receiving a medium access control control element (MAC CE), wherein the MAC CE is configured to update a pathloss estimation reference signal;
    determining a pathloss estimation value based on the pathloss estimation reference signal, wherein an application time of the pathloss estimation value is no later than n+X+T, where n is a time for sending feedback information indicating whether the MAC CE is correctly received, X is a fixed duration, T is a variable duration, and X and T are finite non-zero values; and
    determining transmit power of an uplink signal based on the pathloss estimation value.

2. The method according to claim 1, wherein the method further comprises:
    sending the uplink signal at the determined transmit power after the pathloss estimation value takes effect.

3. The method according to claim 1, wherein T is related to high-layer filtering capability information of a terminal device.

4. The method according to claim 3, wherein the higher-layer filtering capability information comprises at least one of higher-layer filtering configuration information, a quantity of measurements, a measurement periodicity, a measurement setting, or time domain information of the pathloss estimation reference signal; and
    the quantity of measurements is a quantity of measurements of receive power of the pathloss estimation reference signal, the measurement periodicity is a transmission periodicity of the pathloss estimation reference signal, and the measurement setting is a setting related to the pathloss estimation reference signal.

5. The method according to claim 3, wherein T is a sum of a duration in which the terminal device performs higher-layer filtering, and a duration in which the terminal device determines the transmit power of the uplink signal based on the pathloss estimation value.

6. The method according to claim 1, wherein the effective application time of the pathloss estimation value is not earlier than n+X.

7. The method according to claim 1, wherein the MAC CE comprises information about the pathloss estimation reference signal.

8. The method according to claim 7, wherein the MAC CE further comprises a parameter related to the transmit power of the uplink signal, and the parameter related to the transmit power of the uplink signal comprises at least one of target power, a pathloss compensation factor, or a power adjustment parameter.

9. The method according to claim 8, wherein an application time of the parameter related to the transmit power of the uplink signal is no later than n+X, or an application time of the parameter related to the transmit power of the uplink signal is no later than n+X+T.

10. A communications apparatus, comprising:
    a receiver, configured to receive a medium access control control element (MAC CE), wherein the MAC CE is configured to update a pathloss estimation reference signal; and
    a processor, configured to determine a pathloss estimation value based on the pathloss estimation reference signal, wherein an application time of the pathloss estimation value is no later than n+X+T, where n is a time for sending feedback information indicating whether the MAC CE is correctly received, X is a fixed duration, T is a variable duration, and X and T are finite non-zero values, and
    determine transmit power of an uplink signal based on the pathloss estimation value.

11. The apparatus according to claim 10, wherein the apparatus further comprises:
    a transmitter, configured to send the uplink signal at the determined transmit power after the pathloss estimation value takes effect.

12. The apparatus according to claim 10, wherein T is related to high-layer filtering capability information of a terminal device.

13. The apparatus according to claim 12, wherein the higher-layer filtering capability information comprises at least one of higher-layer filtering configuration information, a quantity of measurements, a measurement periodicity, a measurement setting, or time domain information of the pathloss estimation reference signal; and
    the quantity of measurements is a quantity of measurements of receive power of the pathloss estimation reference signal, the measurement periodicity is a transmission periodicity of the pathloss estimation reference signal, and the measurement setting is a setting related to the pathloss estimation reference signal.

14. The apparatus according to claim 12, wherein T is a sum of a duration in which the terminal device performs higher-layer filtering, and a duration in which the terminal device determines the transmit power of the uplink signal based on the pathloss estimation value.

15. The apparatus according to claim 10, wherein the application time of the pathloss estimation value is not earlier than n+X.

16. The apparatus according to claim 10, wherein the MAC CE comprises information about the pathloss estimation reference signal.

17. The apparatus according to claim 16, wherein the MAC CE further comprises a parameter related to the transmit power of the uplink signal, and the parameter related to the transmit power of the uplink signal comprises at least one of target power, a pathloss compensation factor, or a power adjustment parameter.

18. The apparatus according to claim 17, wherein an application time of the parameter related to the transmit power of the uplink signal is no later than n+X, or an application time of the parameter related to the transmit power of the uplink signal is no later than n+X+T.

19. A non-transitory computer-readable storage medium, storing a computer-executable program, which when executed by a processor, causes the processor to implement operations comprising:
 receiving a medium access control control element (MAC CE), wherein the MAC CE is configured to update a pathloss estimation reference signal;
 determining a pathloss estimation value based on the pathloss estimation reference signal, wherein an application time of the pathloss estimation value is no later than n+X+T, where n is a time for sending feedback information indicating whether the MAC CE is correctly received, X is a fixed duration, T is a variable duration, and X and T are finite non-zero values; and
 determining transmit power of an uplink signal based on the pathloss estimation value.

20. The non-transitory computer-readable storage medium according to claim 19, wherein the operations further comprise:
 sending the uplink signal at the determined transmit power after the pathloss estimation value takes effect.

\* \* \* \* \*